(12) United States Patent
Hayashi et al.

(10) Patent No.: US 11,906,414 B2
(45) Date of Patent: *Feb. 20, 2024

(54) FOREIGN SUBSTANCE DETECTION DEVICE AND FOREIGN SUBSTANCE DETECTION METHOD

(71) Applicant: Tokyo Electron Limited, Tokyo (JP)

(72) Inventors: Masato Hayashi, Koshi (JP); Kohei Noguchi, Koshi (JP); Daisuke Kajiwara, Koshi (JP); Koudai Higashi, Koshi (JP)

(73) Assignee: TOKYO ELECTRON LIMITED, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/809,365

(22) Filed: Jun. 28, 2022

(65) Prior Publication Data

US 2022/0326133 A1    Oct. 13, 2022

Related U.S. Application Data

(63) Continuation of application No. 16/071,122, filed as application No. PCT/JP2017/000436 on Jan. 10, 2017, now Pat. No. 11,402,313.

(30) Foreign Application Priority Data

Jan. 21, 2016  (JP) ................................. 2016-009923

(51) Int. Cl.
*G01N 15/06* (2006.01)
*G01N 21/51* (2006.01)
*G01N 21/53* (2006.01)

(52) U.S. Cl.
CPC ............. *G01N 15/06* (2013.01); *G01N 21/51* (2013.01); *G01N 21/53* (2013.01); *G01N 2015/0687* (2013.01); *G01N 2015/0693* (2013.01)

(58) Field of Classification Search
CPC ........ G01N 15/06; G01N 21/51; G01N 21/53; G01N 2015/0687; G01N 2015/0693
See application file for complete search history.

(56) References Cited

U.S. PATENT DOCUMENTS

| | | |
|---|---|---|
| 5,469,251 A | 11/1995 | Kosaka et al. |
| 5,534,999 A | 7/1996 | Koshizuka et al. |
| 7,496,463 B2 | 2/2009 | Nicoli et al. |

(Continued)

FOREIGN PATENT DOCUMENTS

| | | |
|---|---|---|
| CN | 102159935 A | 8/2011 |
| JP | S55-037998 A | 3/1980 |

(Continued)

OTHER PUBLICATIONS

International Search Report for PCT/JP2017/000436 dated Mar. 21, 2017.

(Continued)

*Primary Examiner* — Natalie Huls
*Assistant Examiner* — Sharad Timilsina
(74) *Attorney, Agent, or Firm* — Pearne & Gordon LLP

(57) ABSTRACT

A foreign substance detection device includes a flow path unit through which a fluid is flown; an optical system configured to flatten a laser light from a laser source to be lengthened in a direction intersecting with a flow direction of the fluid; a laser light irradiation unit provided such that an optical path intersects with the flow direction and configured to irradiate the laser light into the flow path unit; a light detection unit which is provided on the optical path having passed through the flow path unit and includes light (Continued)

receiving elements arranged in a lengthwise direction of a transversal cross section of the optical path; a foreign substance detection unit configured to compare a signal level corresponding to intensity of light received by each light receiving element with a threshold value and configured to detect the foreign substances based on a comparison result.

5 Claims, 19 Drawing Sheets

(56) References Cited

U.S. PATENT DOCUMENTS

| | | | |
|---|---|---|---|
| 11,402,313 B2* | 8/2022 | Hayashi | G01N 21/53 |
| 2004/0042008 A1* | 3/2004 | Wagner | G01N 15/14 |
| | | | 356/337 |
| 2007/0010974 A1 | 1/2007 | Nicoli et al. | |
| 2010/0020314 A1 | 1/2010 | Saito et al. | |
| 2011/0071035 A1 | 3/2011 | Sharpe et al. | |
| 2011/0176136 A1 | 7/2011 | Yokota et al. | |
| 2011/0294139 A1 | 12/2011 | Takeda | |
| 2012/0078531 A1 | 3/2012 | Lo et al. | |

FOREIGN PATENT DOCUMENTS

| | | |
|---|---|---|
| JP | S61-126448 A | 6/1986 |
| JP | H05-215664 A | 8/1993 |
| JP | H05-346390 A | 12/1993 |
| JP | H07-049302 A | 2/1995 |
| JP | 09-196842 A | 7/1997 |
| JP | H10-335222 A | 12/1998 |
| JP | 2002-062249 A | 2/2002 |
| JP | 2003-130784 A | 5/2003 |
| JP | 5719473 B1 | 3/2015 |
| JP | 2015-194359 A | 11/2015 |

OTHER PUBLICATIONS

Shen, et al. "Research of Laser Particle Sizer Based on Scattering Theory", College of Mechatronical Engineering and Automation National University of Defense Technology, 410073, China, Jun. 20-23, 2008.

Lilienfeld, "Optical Detection of Particle Contamination on Surfaces: A Review, Aerosol Science and Technology", Jun. 6, 2007.

* cited by examiner

FIG. 7
transversal cross section of optical path
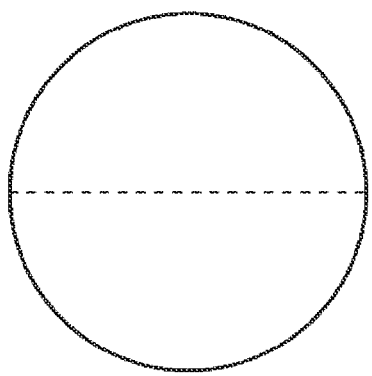
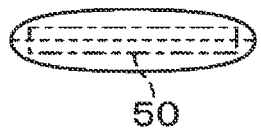
50
58

FOREIGN SUBSTANCE DETECTION DEVICE AND FOREIGN SUBSTANCE DETECTION METHOD

CROSS-REFERENCE TO RELATED APPLICATION

This is a continuation application of U.S. patent application Ser. No. 16/071,122, filed on Jul. 19, 2018, which is a U.S. national phase application under 35 U.S.C. § 371 of PCT Application No. PCT/JP2017/000436 filed on Jan. 10, 2017, which claims the benefit of Japanese Patent Application No. 2016-009923 filed on Jan. 21, 2016, the entire disclosures of which are incorporated herein by reference.

TECHNICAL FIELD

The embodiments described herein pertain generally to a foreign substance detection device and a foreign substance detection method for optically detecting a foreign substance contained in a fluid which is to be supplied to a processing target object.

BACKGROUND ART

A manufacturing process for a semiconductor device includes a process of performing a liquid processing on, for example, a semiconductor wafer (hereinafter, simply referred to as "wafer"). By way of example, in a process of forming a resist pattern, various kinds of chemical liquids such as a resist are used, and each chemical liquid is discharged onto the wafer via a nozzle after being supplied from a chemical liquid bottle through a pipeline, which is configured as a flow path, provided with a device such as a valve or the like. Here, a particle adhering to the pipeline or various devices may be mixed into the chemical liquid being supplied to the wafer, and a bubble may be generated in this chemical liquid. Further, in case of using a chemical liquid containing a resin material, for example, in case of using the resist, a polymer component bigger than a normal polymer component, that is, a so-called abnormal polymer component may be included therein.

For example, if the particle, the bubble or the abnormal polymer is included in the resist, a defect in developing may be caused. In this regard, there is known a processing technique of monitoring these foreign substances and purifying the chemical liquid in a supply system including, for example, the pipeline until the amount of the foreign substances falls below a set value. As a way to monitor the foreign substances, there is known a method using a particle counter configured to irradiate a laser light to the chemical liquid within the flow path and measure the amount of the foreign substances by receiving scattered light from the foreign substances.

Meanwhile, as a design rule of the semiconductor device is getting miniaturized, an allowable particle size tends to become further smaller. Thus, there is a demand for a technique capable of detecting a more microscopic foreign substance with high accuracy. Since, however, the foreign substance as a detection target gets smaller, S (Signal level)/N (Noise level) is decreased, thus making it difficult to accomplish highly accurate detection. Further, if it is attempted to detect the abnormal polymer having a large size in the resist, an intensity of the laser light corresponding to the normal polymer having a small size becomes a noise, so that it is difficult to detect the abnormal polymer with high accuracy. By way of example, described in Patent Document 1 is a technique of improving counting efficiency by providing a plurality of light receiving elements configured to receive scattered light generated by a particle when a laser light is transmitted through the flow path. This technique is, however, different from the present disclosure in a principle in which the detection is made.

Patent Document 1: Japanese Patent No. 5,719,473

In view of the foregoing, exemplary embodiments provide a technique capable of detecting a microscopic foreign substance flowing in a flow path with high accuracy.

SUMMARY

In one exemplary embodiment, there is provided a foreign substance detection device configured to detect a foreign substance in a fluid supplied to a processing target object. The foreign substance detection device comprising a flow path unit forming a flow path through which the fluid supplied to the processing target object is flown; a laser light irradiation unit, having an optical system configured to flatten a laser light from a laser source to be lengthened in a direction intersecting with a flow direction of the fluid in the flow path unit, provided such that an optical path intersects with the flow direction of the flow in the flow path unit and configured to irradiate the laser light into the flow path unit; a light detection unit, provided on the optical path having passed through the flow path unit, including multiple light receiving elements arranged in a lengthwise direction of a transversal cross section of the optical path; and a foreign substance detection unit configured to compare a signal level according to a signal level of an electric signal corresponding to intensity of light received by each of the multiple light receiving elements with a threshold value corresponding to a signal level of an electric signal obtained when an interference pattern is generated by the foreign substance in the fluid and configured to detect the foreign substance based on a comparison result.

In another exemplary embodiment, there is provided a foreign substance detection method of detecting a foreign substance in a fluid supplied to a processing target object. The foreign substance detection method comprises flowing the fluid supplied to the processing target object into a flow path unit; flattening a laser light from a laser source to be lengthened in a direction intersecting with a flow direction of the fluid in the flow path unit by an optical system provided in a laser light irradiation unit; irradiating the flattened laser light from the laser light irradiation unit into the flow path unit such that the flow direction of the fluid in the flow path unit and an optical path intersect with each other; receiving the laser light irradiated into the flow path unit by each of multiple light receiving elements provided on the optical path having passed through the flow path unit and arranged in a lengthwise direction of a transversal cross section of the optical path; and comparing a signal level according to a signal level of an electric signal corresponding to intensity of light received by each of the multiple light receiving elements with a threshold value corresponding to a signal level of an electric signal obtained when an interference pattern is generated by the foreign substance in the fluid, and detecting the foreign substance based on a result of the comparing.

According to the exemplary embodiments, the foreign substance detection device includes the optical system configured to flatten the laser light from the laser source to be lengthened in the direction intersecting with the flow direction of the fluid in the flow path unit; the multiple light receiving elements arranged in the lengthwise direction of the transversal cross section of the optical path at the rear end of the flow path unit. Further, the signal level according to the signal level of the electric signal corresponding to the intensity of the light received by each of the multiple light receiving elements is compared with the threshold value corresponding to the signal level of the electric signal obtained when the interference pattern is generated by the foreign substance in the fluid, so that the foreign substance is detected based on a comparison result. Thus, the foreign substance having the small particle size can be detected with high accuracy.

BRIEF DESCRIPTION OF THE DRAWINGS

FIG. 7 is a diagram illustrating a transversal cross section of an optical path of a laser light.

DETAILED DESCRIPTION

Figure 1:
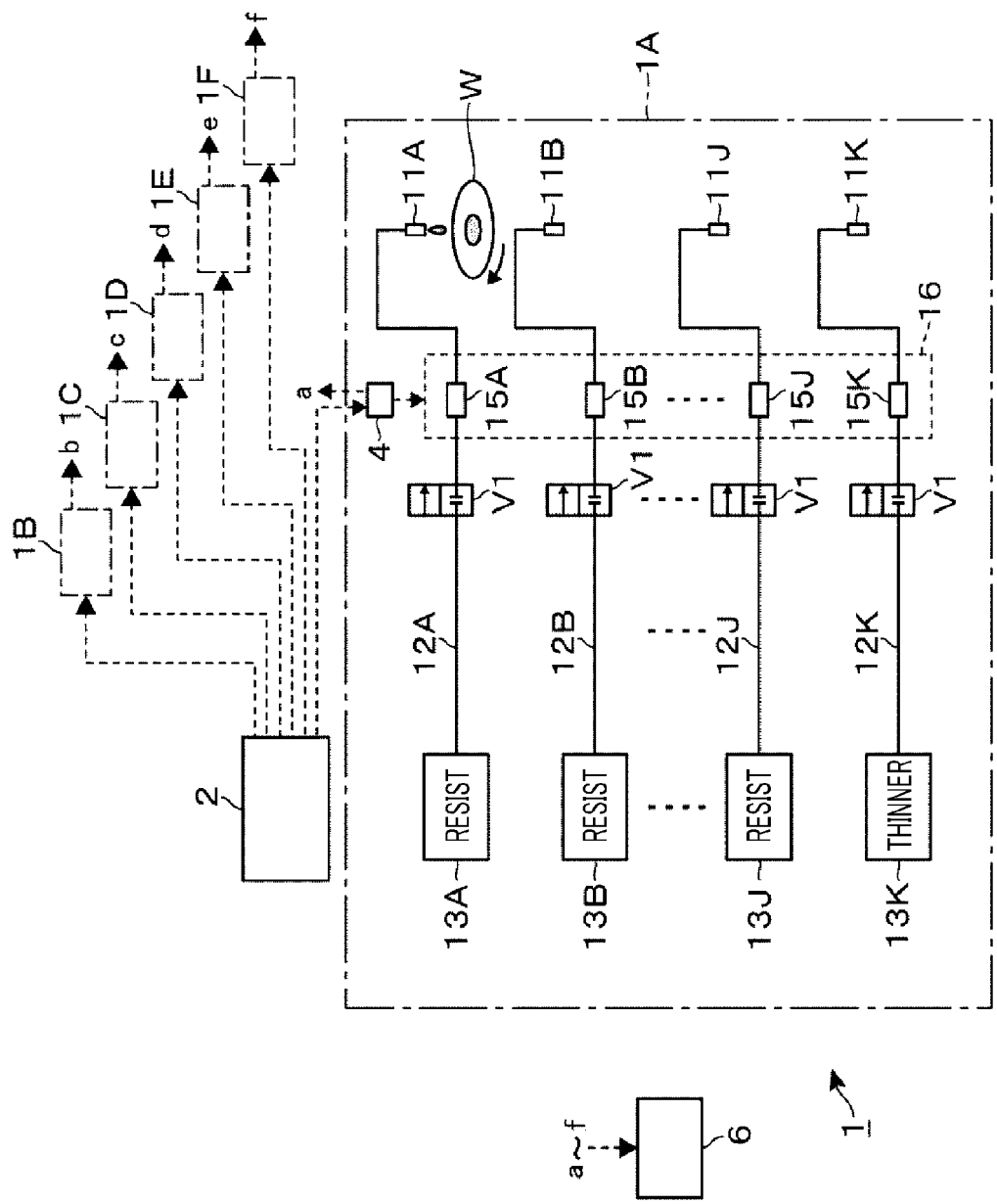
FIG. 1 is a schematic configuration view of a coating and developing apparatus according to an exemplary embodiment.

FIG. 1 is a schematic diagram of a coating and developing apparatus 1 to which a foreign substance detection device according to an exemplary embodiment is provided. This coating and developing apparatus 1 is equipped with: resist coating modules 1A and 1B; antireflection film forming modules 1C and 1D; and protective film forming modules 1E and 1F each of which is configured to perform a processing by supplying a chemical liquid to a substrate as a processing target object, for example, a wafer W. These modules 1A to 1F are chemical liquid supply modules configured to supply chemical liquids to the wafer W and perform processings thereon. The coating and developing apparatus 1 performs formation of an antireflection film, formation of a resist film and formation of a protective film for protecting the resist film during exposure in sequence by supplying various kinds of chemical liquids to the wafer W from the modules 1A to 1F, and then, develops the liquid immersion exposed wafer W.

Each of the aforementioned modules 1A to 1F is equipped with a supply path for a chemical liquid, and the coating and developing apparatus 1 is configured to detect a foreign substance in the chemical liquid flowing in this supply path. The chemical liquid flown in this supply path is supplied to the wafer W. The supply of the chemical liquid to the wafer W and the detection of the foreign substance are performed at the same time. Here, the foreign substance refers to, by way of non-limiting example, a particle, a bubble, an abnormal polymer having a larger particle size than a normal polymer constituting the chemical liquid, and so forth. The detection of the foreign substance specifically refers to detection of the total number of foreign substances flowing in a predetermined detection region within the supply path of the chemical liquid during a preset time period and a size of each foreign substance.

Figure 2:
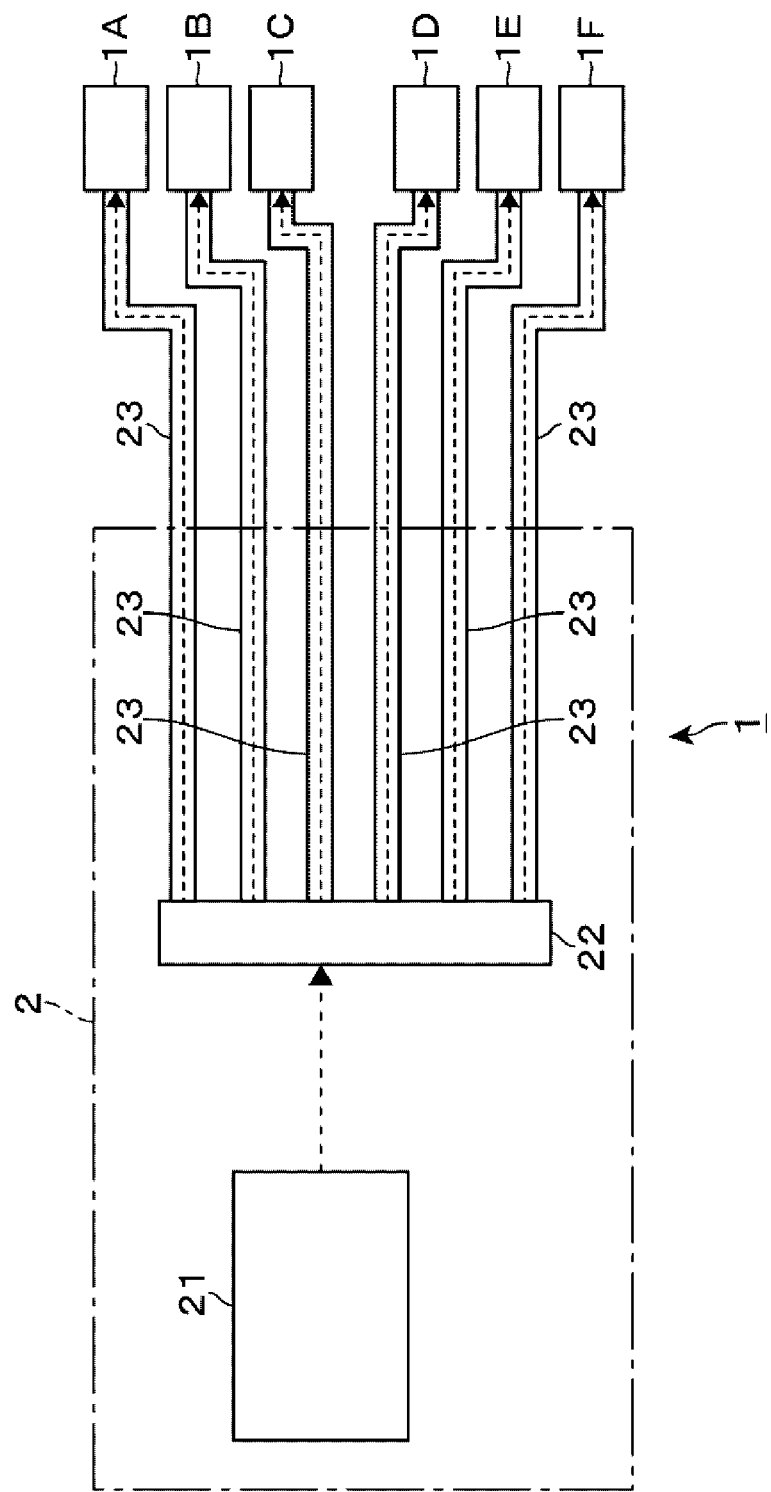
FIG. 2 is a schematic configuration view of a light supply unit belonging to the coating and developing apparatus.

The coating and developing apparatus 1 is equipped with a light supply unit 2, and FIG. 2 illustrates a configuration of the light supply unit 2. The light supply unit 2 is equipped with a light source 21 configured to output a laser light; and a splitter 22 serving as a split light path formation unit. The laser light output from the light source 21 is split into six laser lights by the splitter 22 to be guided via six fibers 23 to foreign substance detection units 4 provided in the modules 1A to 1F, respectively. In FIG. 1, these split laser lights are indicated by dashed-lined arrows.

The modules 1A to 1F have a substantially same configuration. Here, a schematic configuration of the resist coating module 1A shown in FIG. 1 will be explained. The resist coating module 1A is equipped with, by way of example, eleven nozzles 11A to 11K, and, among them, ten nozzles 11A to 11J are configured to discharge a resist as a chemical liquid onto the wafer W, thus allowing a resist film as a coating film to be formed. The nozzle 11K is configured to discharge a thinner onto the wafer W. The thinner is supplied onto the wafer W before the resist is supplied. The thinner is a chemical liquid for pre-wetting and serves to improve wettability of the resist.

Downstream ends of chemical liquid supply lines 12A to 12J constituting supply paths of the chemical liquids are respectively connected to the nozzles 11A to 11J, and upstream ends of the chemical liquid supply lines 12A to 12J are respectively connected to resist supply sources 13A to 13J via valves V1. Each of the resist supply sources 13A to 13J is equipped with, by way of example, a bottle in which a resist is stored; and a pump configured to force-feed the resist supplied from the bottle to corresponding one of the nozzles 11A to 11J. The resists stored in the respective bottles of the resist supply sources 13A to 13J are all of different kinds, and one kind of resist selected from these ten kinds of resists is supplied to the wafer W.

The nozzle 11K is connected with a downstream end of a chemical liquid supply line 12K, and an upstream end of the chemical liquid supply line 12K is connected to a supply source 13K via a valve V1. The supply source 13K has the same configuration as the other supply sources 13A to 13J except that the thinner is stored therein instead of the resists.

That is, in the processing of the wafer W, the timings when the chemical liquids flow in the chemical liquid supply lines 12A to 12K are all different. The chemical liquid supply lines 12A to 12K are made of a flexible material such as, but not limited to, resin and configured not to interfere with movements of the nozzles 11A to 11K to be described later. On the chemical liquid supply lines 12A to 12K, cuvettes 15A to 15K are provided between the nozzles 11A to 11K and the valves V1, respectively. Each of the cuvettes 15A to 15K is configured as a flow path unit for measurement of a foreign substance and the foreign substance flowing therein is detected. Details of the cuvettes 15A to 15K will be discussed later.

Figure 3:
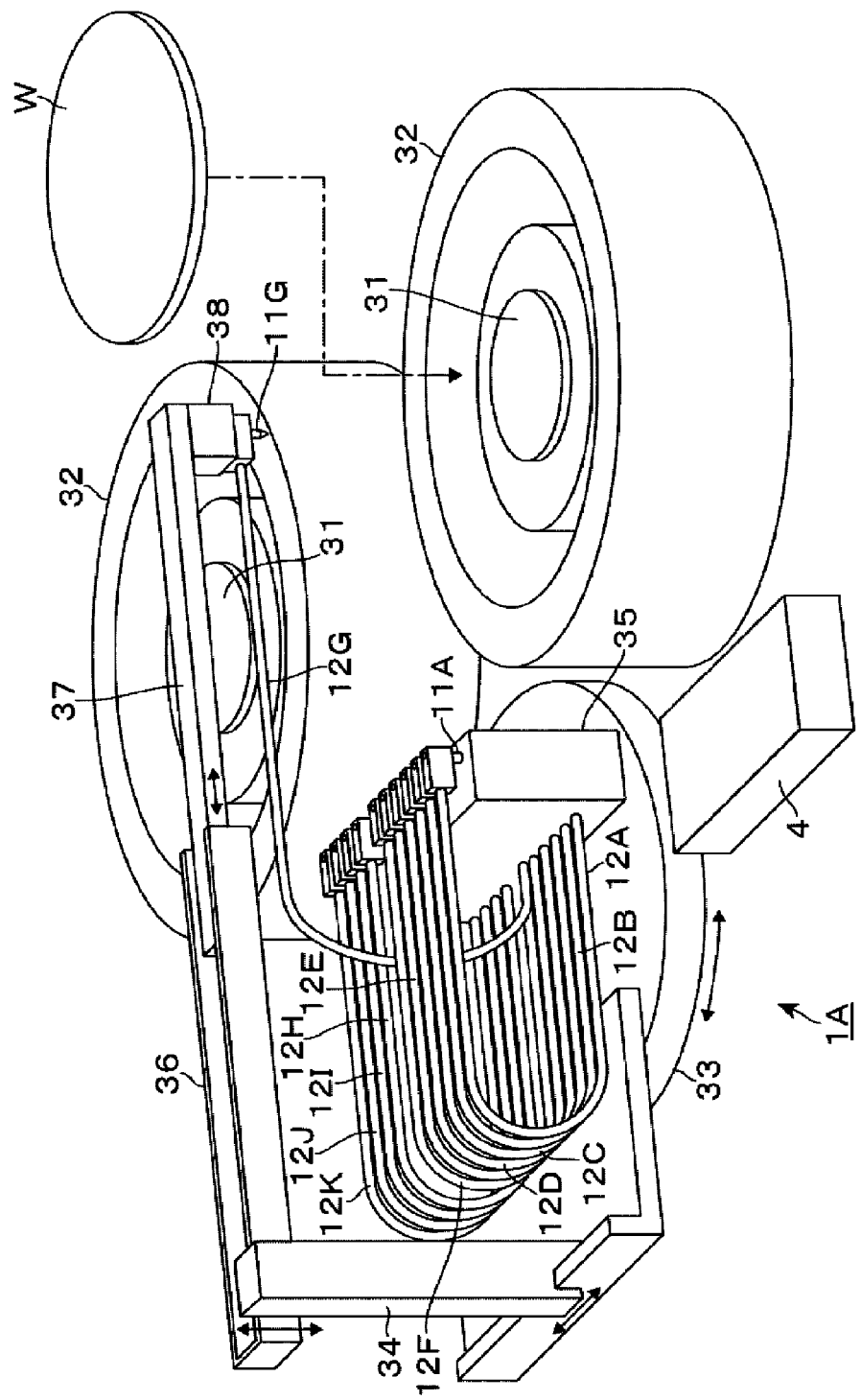
FIG. 3 is a perspective view of a resist coating module belonging to the coating and developing apparatus.

FIG. 3 depicts an example of a further detailed configuration of the resist coating module 1A. In the drawing, reference numerals 31 denote spin chucks each of which is configured to attract and hold a central portion of a rear surface of the wafer W and rotate the held wafer W around a vertical axis. Further, in the drawing, reference numerals 32 denote recovery cups each of which is configured to surround, from below and from the side, the wafer W held by the corresponding spin chuck 31 to suppress scattering of the chemical liquids.

In the drawing, a reference numeral 33 denotes a rotary stage configured to be pivotable around a vertical axis, and a horizontally movable vertical supporting column 34 and a holder 35 for the nozzles 11A to 11K are provided at the rotary stage 33. A reference numeral 36 denotes an elevating unit configured to be movable up and down along the supporting column 34, and a reference numeral 37 is an arm configured to be movable along the elevating unit 36 in a horizontal direction orthogonal to a moving direction of the supporting column 34. An attaching/detaching mechanism 38 for the nozzles 11A to 11K is provided at a leading end of the arm 37. The nozzles 11A to 11K are moved between a position above each spin chuck 31 and the holder 35 by cooperation between the rotary stage 33, the supporting column 34, the elevating unit 36 and the arm 37.

Figure 4:
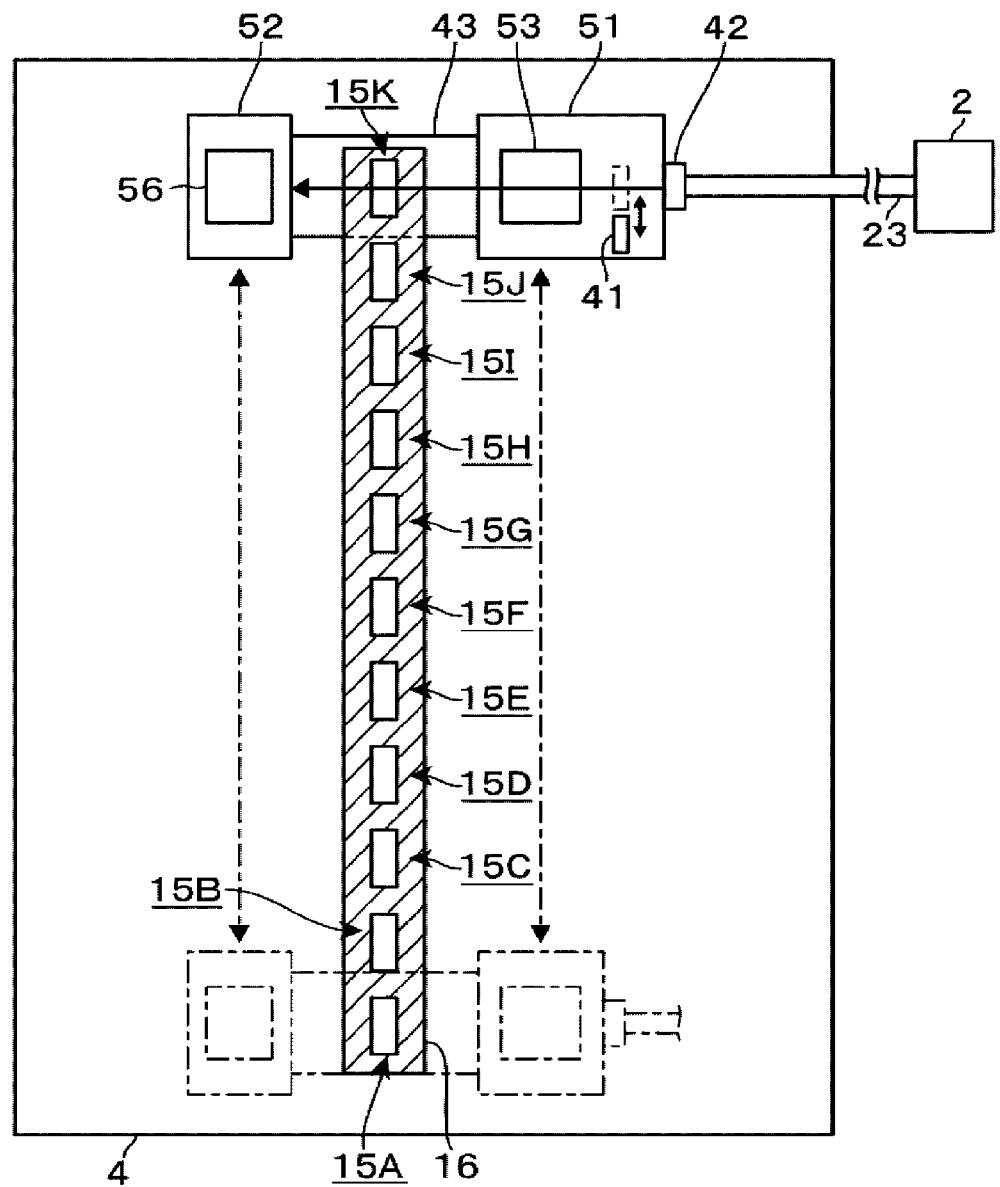
FIG. 4 is a schematic configuration view of a foreign substance detection unit which constitutes a liquid processing system.

The foreign substance detection unit 4 is provided at a side of the aforementioned rotary stage 33 and the recovery cup 32 so as not to interference with movements of the arm 37 and the supporting column 34. This foreign substance detection unit 4, the aforementioned light supply unit 2 and a controller 6 to be described later constitute a foreign substance detection device according to the exemplary embodiment. FIG. 4 is a plan view of the foreign substance detection unit 4. The foreign substance detection unit 4 includes a laser light irradiation unit 51, a light receiving unit 52 and a flow path array 16. A downstream end of the aforementioned fiber 23 is connected to the laser light irradiation unit 51 via a collimator 42, and the collimator 42 guides the laser light guided from the fiber 23 to the laser light irradiation unit 51 as a parallel ray. The fiber 23 is wound within the foreign substance detection unit 4.

By way of example, while the coating and developing apparatus 1 is being operated, light is always supplied to the fiber 23 from the light supply unit 2, and a state in which the light is supplied to the flow path array 16 and a state in which the supply of the light to the flow path array 16 is stopped is switched by opening/closing a shutter 41 to be described later. A speed at which the shutter 41 is moved from either one of a shielding position and an opening position to the other is, by way of non-limiting example, 100 milliseconds. Further, the fiber 23 has flexibility so as not to disturb a movement of the laser light irradiation unit 51 to be described later.

Figure 5:
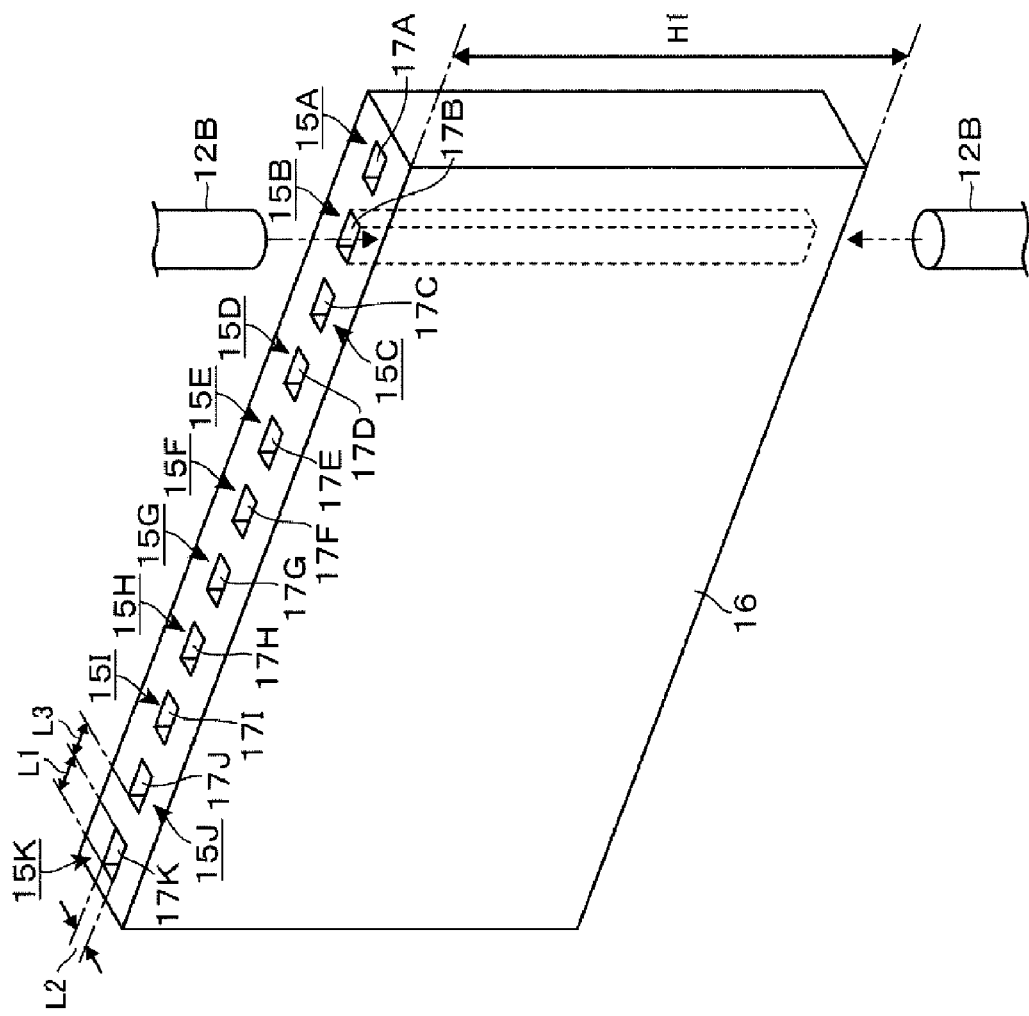
FIG. 5 is a perspective view of a flow path array which constitutes the foreign substance detection unit.

The flow path array 16 will be explained with reference to a perspective view of FIG. 5. The flow path array 16 constituting a flow path unit for the chemical liquids is made of quartz, and is configured as a transversally elongated rectangular block and provided with eleven through holes formed in the vertical direction. These through holes are arranged along the lengthwise direction of the flow path array 16, and the respective through holes and wall portions around the through holes are configured as the aforementioned cuvettes 15A to 15K, respectively. Accordingly, the cuvettes 15A to 15K are configured as uprightly standing tubes, and the chemical liquids flow downwards in the respective through holes constituting the cuvettes 15A to 15K. The through holes of the cuvettes 15A to 15K are referred to as flow paths 17A to 17K. The flow paths 17A to 17K have the same configuration and are provided via the chemical liquid supply lines 12A to 12K, respectively, as described above.

If the arrangement direction of the flow paths 17A to 17K are defined as a left-right direction, a transversal cross section of each of the flow paths 17A to 17K has a rectangular shape whose sides are aligned in the left-right direction and in a forward-backward direction. As an example of a size of each of the flow paths 17A to 17K, a width L1 in the left-right direction is 2 mm; a width L2 in the forward-backward direction is 200 µm; and a height H1 is 25 mm. Further, a width L3 between neighboring flow paths 17 is 3 mm.

Referring back to FIG. 4, the laser light irradiation unit 51 and the light receiving unit 52 are disposed to face each other with the flow path array 16 therebetween in the forward-backward direction. In FIG. 4, a reference numeral 43 is a stage configured to support the laser light irradiation unit 51 and the light receiving unit 52 from below the flow path array 16 and configured to be movable in the left-right direction by a non-illustrating moving mechanism. As the stage 43 is moved, the laser light irradiation unit 51 is capable of irradiating the light guided from the fiber 23 to one of the flow path 17 selected from the flow paths 17A to 17K, and the light receiving unit 52 receives the light irradiated to and having passed through the flow path 17. That is, an optical path is formed in the flow path 17 to intersect with a flow direction of the chemical liquid therein.

Figure 6:
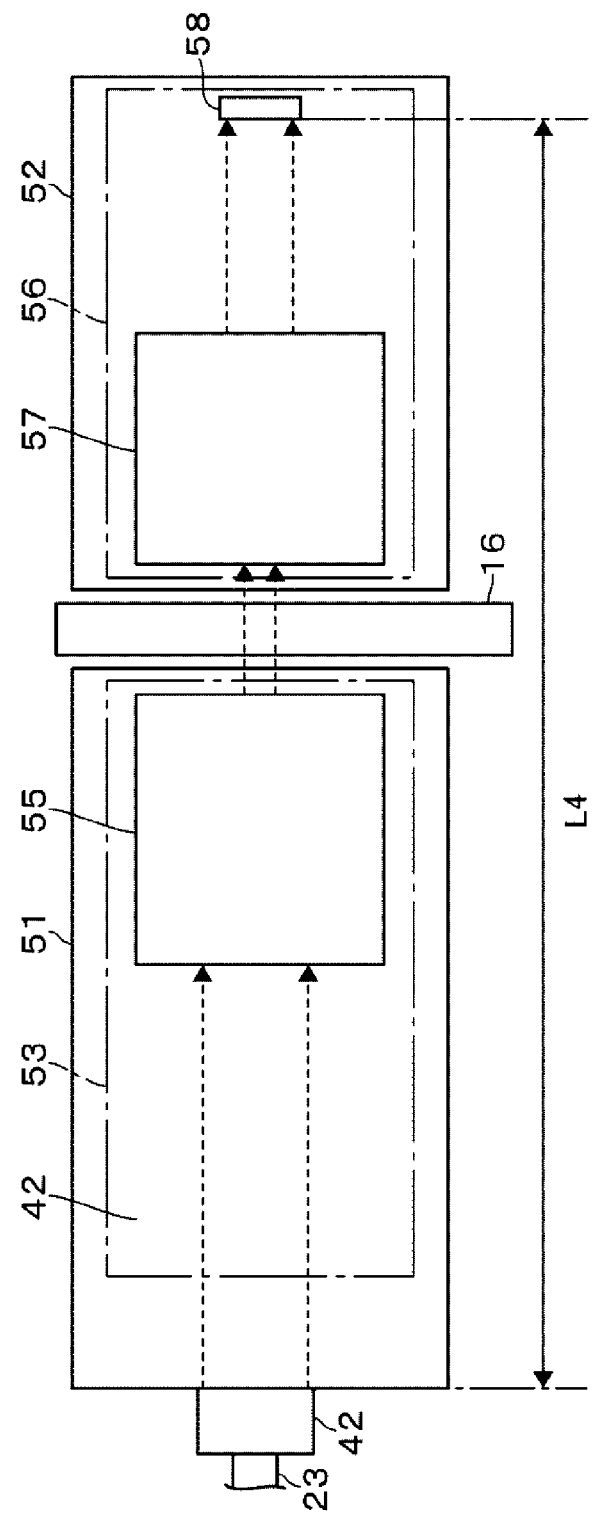
FIG. 6 is a side view of a laser light irradiation unit, a light receiving unit and the flow path array which constitute the foreign substance detection unit.

Now, referring to FIG. 6, the laser light irradiation unit 51 will be discussed. For the convenience of explanation, a direction oriented from the laser light irradiation unit 51 toward the light receiving unit 52 is defined as a rear side. Further, in FIG. 6, an optical path is indicated by dotted-lined arrows. The laser light irradiation unit 51 is equipped with an optical system 53, and this optical system 53 includes, by way of non-limiting example, a light condensing unit 55. Further, though not shown in FIG. 6, the laser light irradiation unit 51 is equipped with the aforementioned shutter 41 as shown in FIG. 4.

The aforementioned collimator 42 is configured to irradiate laser light toward the rear side in the horizontal direction. The shutter 41 is configured to open/close the optical path as it is moved between the shielding position (indicated by a dashed line in FIG. 4) where it closes the optical path between the collimator 42 and the optical system 53 and the opening position (indicated by a solid line in FIG. 4) where it is retreated from the optical path.

The light condensing unit 55 includes, by way of example, a lens in order to condense the laser light irradiated from the collimator 42 to the cuvette 15, and this lens may include a lens called a laser line generator lens or a Powell lens. Besides the lens, the light condensing unit 55 may also be equipped with a member such as a reflection mirror or a prism. Further, a number of the included lens may be one or more. FIG. 7 illustrates a transversal cross section of the optical path changed while the laser light travels. This transversal cross section is a cross section which transverses an optical path formation direction, and, to be more specific, a cross section of the optical path viewed in the forward-backward direction. Illustrated at a top side of FIG. 7 is a cross section of the optical path from the collimator 42 toward the light condensing unit 55, and this transversal cross section is a circular spot having a diameter of, e.g., 3 mm.

If an upper half of the laser light irradiated from the collimator 42 is referred to as a first laser light and a lower half as a second laser light, that is, if one side (upper stream side) and the other side (downstream side) of the laser light when the laser light is viewed in the flow direction of the chemical liquid in the cuvette 15 are referred to as the first laser light and the second laser light, respectively, the first laser light and the second laser light are respectively irradiated to an upper light receiving element 45A and a lower light receiving element 45B to be described later. A dotted line in the circular spot at the top side of FIG. 7 indicates an imaginary boundary between the first laser light and the second laser light. Further, at an intermediate side and a bottom side of FIG. 7, there are illustrated the light irradiated from the laser light irradiation unit 51 as will be described later, and a boundary between the first laser light and the second laser light is also indicated by a dotted line in each of these figures.

Figure 8:
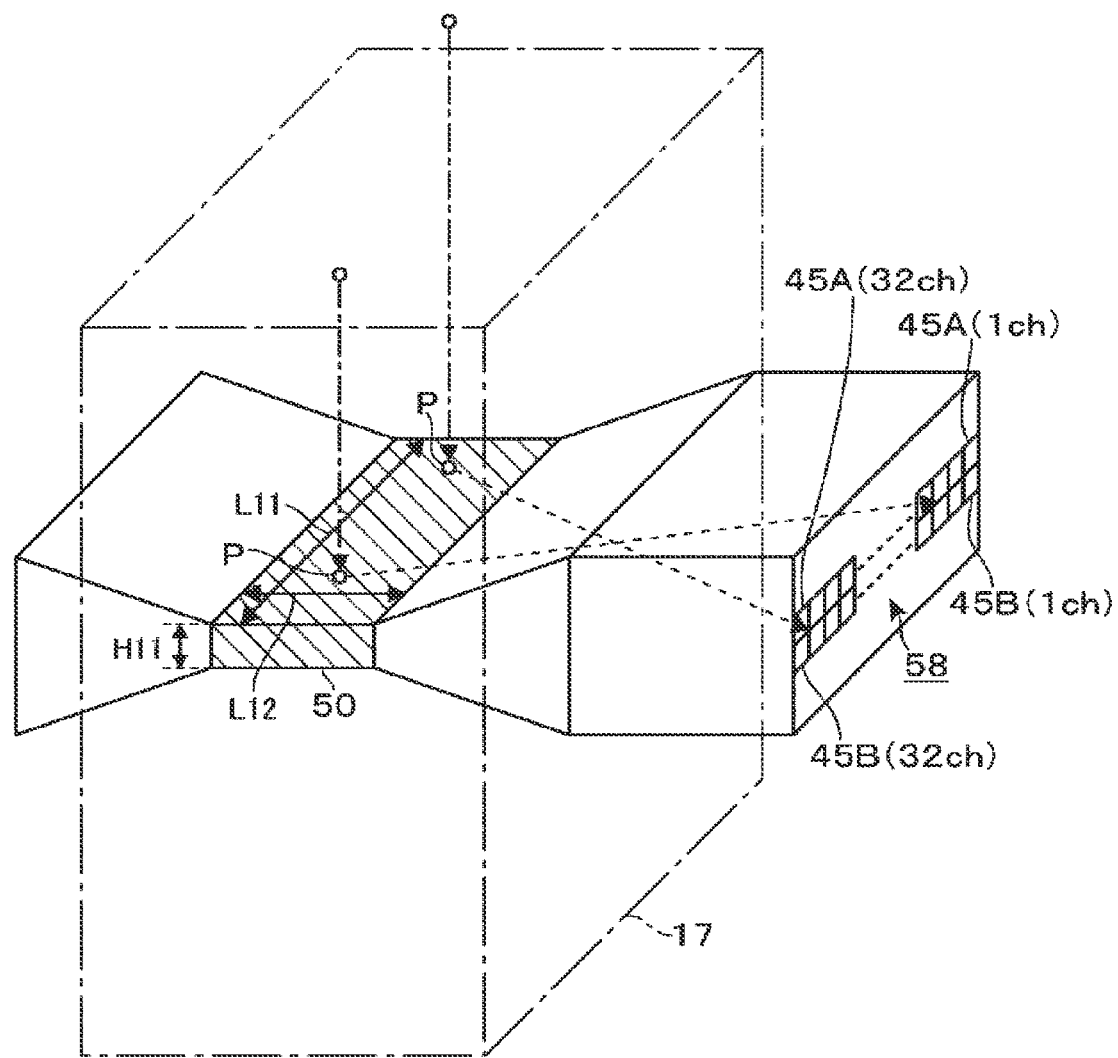
FIG. 8 is a diagram schematically illustrating the optical path.

At the intermediate side of FIG. 7, there is depicted a transversal cross section of the optical path within the cuvette 15 formed by the light irradiated from the light condensing unit 55. This transversal cross section is of an elliptic spot shape having a longer diameter aligned in the left-right direction. The light condensing unit 55 flattens the laser light such that a direction orthogonal to the flow direction of the chemical liquid is lengthened. The optical path of the light irradiated from the light condensing unit 55 in this way is schematically depicted in FIG. 8. In this optical path, a region, which is formed within the flow path 17 of the cuvette 15 and which has a relatively high energy density, is a detection region of a foreign substance (indicated by a notation P in the drawing). That is, the foreign substance P, which has entered the detection region as a condensing region after being flowing through the corresponding flow path 17 along with the chemical liquid, is detected.

As stated in FIG. 7, the spot of the laser light within the cuvette 15 is of the elliptic shape. When viewed in the optical path direction (forward-backward direction), a transversally elongated rectangular region at a central portion within this spot becomes the aforementioned detection region, and the light of this detection region is irradiated to the light receiving elements 45A and 45B to be described later. This detection region is assigned a reference numeral 50, and, in FIG. 8, this detection region 50 is illustrated by hatching. A width L11 of this detection region 50 in the left-right direction is 10 μm to 200 μm, in this example, 120 μm. Further, a height H11 is 1.88 μm, and a width L12 in the forward-backward direction is, e.g., 15.6 μm. This width L12 is a Rayleigh length of the laser light irradiated from the light condensing unit 55.

Figure 9:
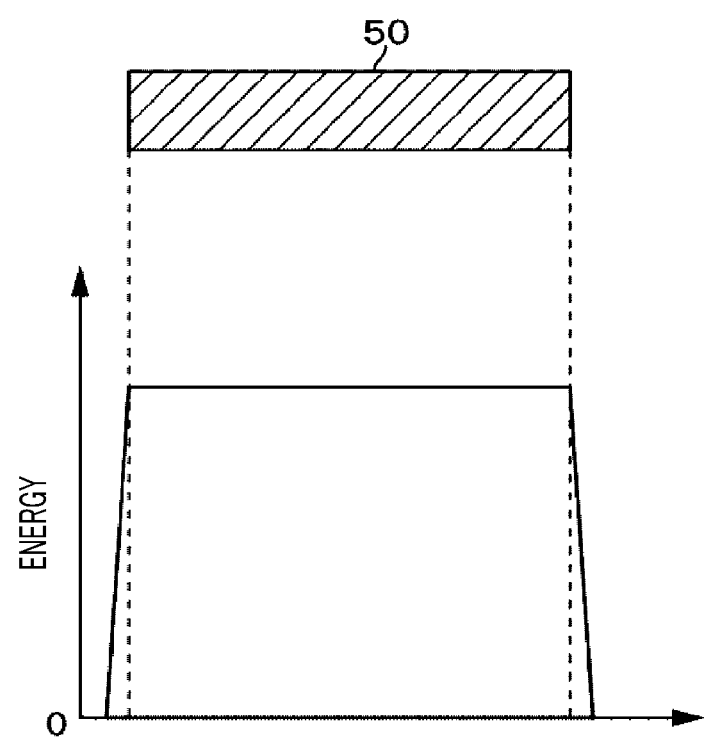
FIG. 9 is a graph showing an energy distribution of a foreign substance measurement region formed by the optical path.

FIG. 9 is a graph showing energy distribution of this detection region 50 in the left-right direction. Individual positions on a horizontal axis of the graph correspond to individual left-right positions of the detection region 50 viewed in the optical path formation direction shown on the graph in the drawing. A vertical axis of the graph indicates a magnitude of energy, and an upper position on the vertical axis indicates larger energy. As can be seen from this graph, the energy distribution in the left-right direction of the detection region 50 are substantially same, and, accordingly, a waveform of the graph indicating the energy distribution is of a substantially rectangular shape. The transversally elongated detection region 50 having this energy distribution is formed to improve detection accuracy of the foreign substances P by increasing a ratio of an area of the detection region 50 to an area of the flow path 17 of the cuvette 15 when viewed from the top and by increasing a ratio of a number of the detected foreign substances P to a total number of foreign substances P flowing in the flow path 17.

Referring back to FIG. 6, the light receiving unit 52 will be explained. The light receiving unit 52 is equipped with an optical system 56, and this optical system 56 includes a light condensing unit 57 implemented by one or more condensing lenses; and a light detector 58 provided at the rear side of the light condensing unit 57. The light having passed through the cuvette 15 after being irradiated to the cuvette 15 from the laser light irradiation unit 51 is condensed by the light condensing unit 57 to be irradiated to the light detector 58. The light condensing unit 57 may include, like the aforementioned light condensing unit 55, a member such as a reflection mirror or a prism in addition to the lens. Further, a distance L4 from the collimator 42 to the light detector 58 shown in FIG. 6 may be equal to or less than, e.g., 100 mm. At the bottom side of FIG. 7, there is illustrated a transversal cross section of the optical path on the light detector 58.

Figure 10:
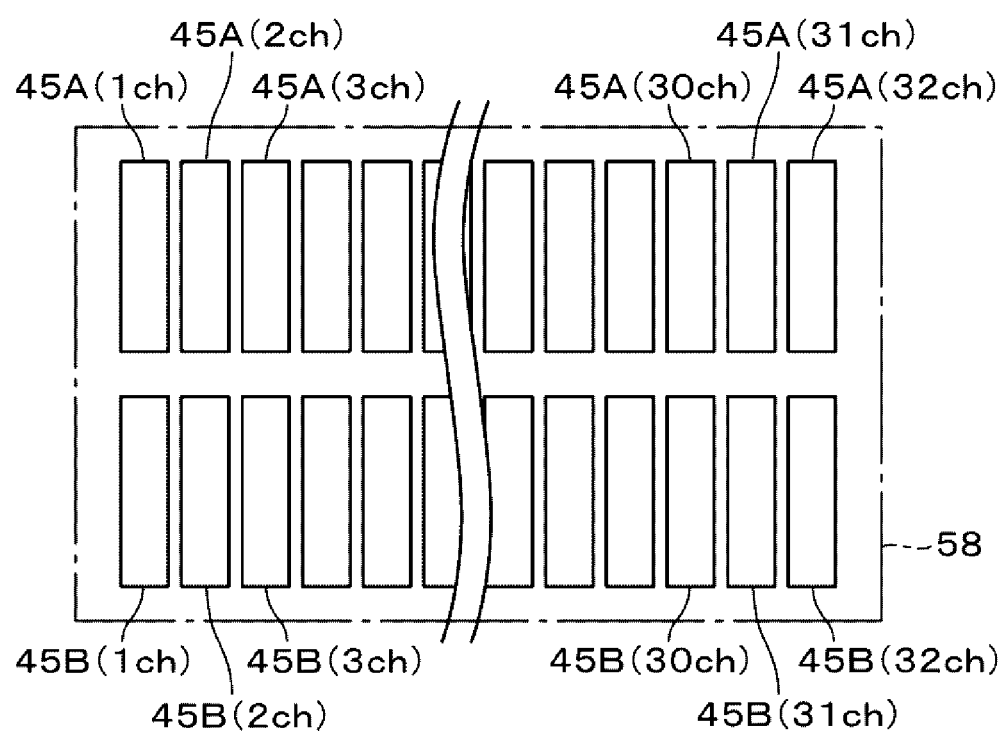
FIG. 10 is a plan view of light receiving elements of the light receiving unit.

The light detector 58 will be explained with reference to a plan view of FIG. 10. The light detector 58 is composed of, for example, sixty four light receiving elements each of which is implemented by, but not limited to, a photodiode. These light receiving elements are arranged at a regular interval therebetween to form a matrix of, e.g., 2×32. If the light receiving elements arranged at an upper side are referred to as upper light receiving elements 45A and the light receiving elements arranged at a lower side as lower light receiving elements 45B, the upper light receiving elements 45A and the lower light receiving elements 45B are located on the optical path of the first laser light and on the optical path of the second laser light, respectively. To elaborate, the upper light receiving elements 45A as a plurality of first light receiving elements are arranged in a light reception region of the first laser light along a lengthwise direction of the transversal cross section of the optical path of the corresponding first laser light, whereas the lower light receiving elements 45B as a plurality of second light receiving elements are arranged in a light reception region of the second laser light along a lengthwise direction of the transversal cross section of the optical path of the corresponding second laser light.

Each upper light receiving element 45A and each lower light receiving element 45B provided at each same position in the left-right direction constitutes each single set. These sets of the light receiving elements may be assigned channel numbers 1 ch to 32 ch in sequence from the left side when viewed toward the rear side. Further, the light receiving elements 45A and 45B of 1 ch may sometimes be referred to as $1^{st}$ light receiving elements 45A and 45B; the light receiving elements 45A and 45B of 2 ch, $2^{rd}$ light receiving elements 45A and 45B; the light receiving elements 45A and 45B of 3 ch, $3^{rd}$ light receiving elements 45A and 45B; . . . ; and the light receiving elements 45A and 45B of 32 ch, $32^{th}$ light receiving element 45A and 45B.

Figure 11:
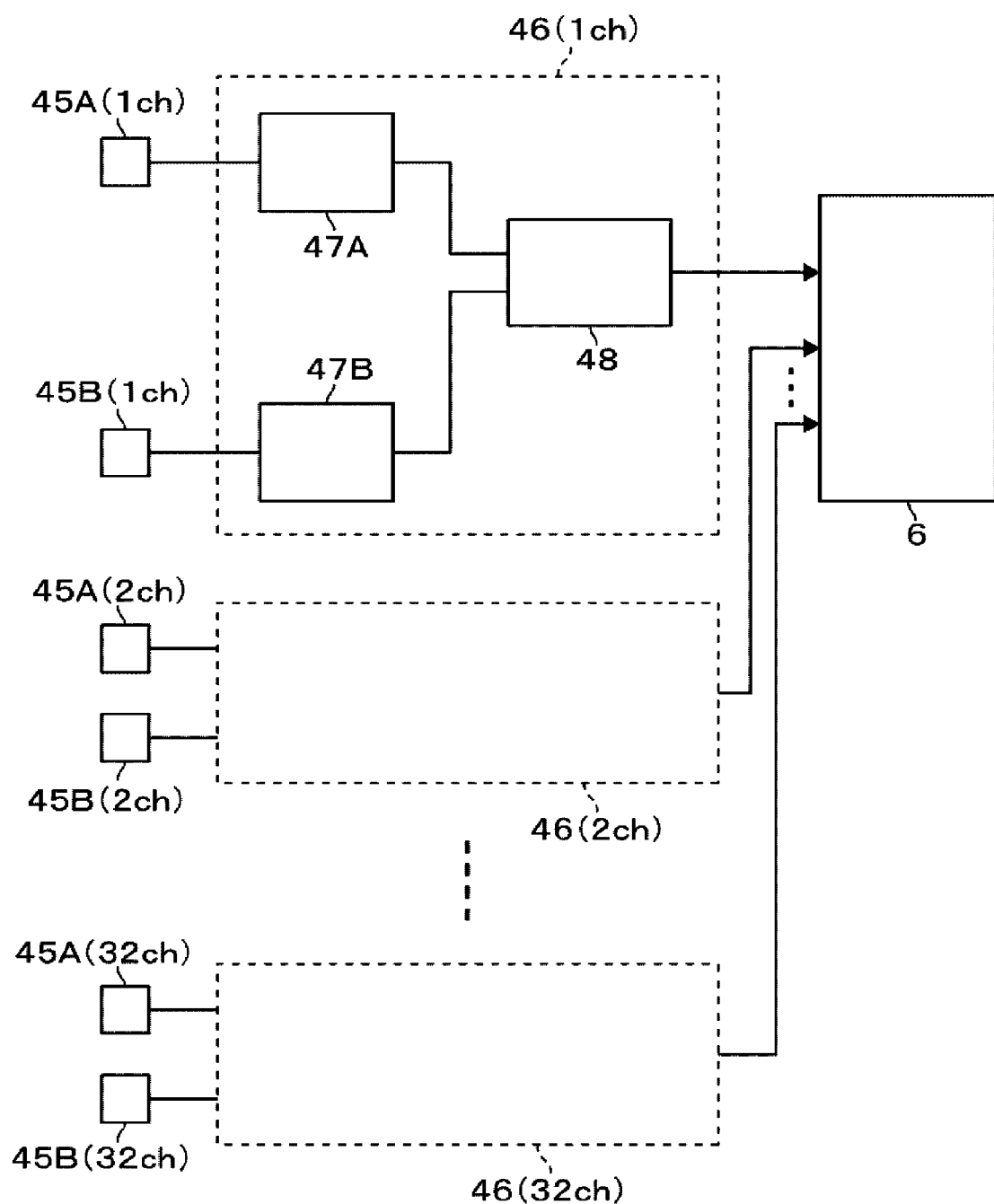
FIG. 11 is a block diagram showing circuit units connected to the light receiving elements.

The foreign substance detection unit 4 is equipped with a total number of thirty two circuit units 46 configured to correspond to the respective channels of the light receiving elements 45A and 45B. Referring to FIG. 11, these circuit units 46 will be explained. Each circuit unit 46 is equipped with transimpedance amplifiers (TIA) 47A and 47B provided at rear ends of the light receiving elements 45A and 45B, respectively; and a differential circuit 48 provided at the rear end of the TIA 47A and 47B. The light receiving elements 45A and 45B supply electric currents according to intensities of the received lights to the TIA 47A and 47B, and the TIA 47A and 47B output voltage signals corresponding to the supplied electric currents to the differential circuit 48. The differential circuit 48 outputs a differential voltage signal between the voltage signal from the TIA 47A and the voltage signal from the TIA 47B to the controller 6.

The controller 6 performs detection of the foreign substance based on the signal output from the differential circuit 48 of the circuit unit 46. Here, the detection of the foreign substance is performed based on the signal corresponding to the difference between the outputs from the light receiving elements 45A and 45B in order to remove a noise commonly detected by the light receiving elements 45A and 45B. The circuit units 46 may also be assigned same channel numbers as those of the channel numbers of their corresponding light receiving elements 45A and 45B connected thereto.

In the flow path 17 of the cuvette 15, the chemical liquid (resist or thinner) flows downwards, and if the foreign substance P enters the detection region 50 along with this flow of the chemical liquid, an interference pattern S is generated at a position according to a position of the corresponding foreign substance P. Accordingly, the intensities of the lights received by the upper light receiving element 45A and the lower light receiving element 45B of the channel corresponding to the position of the interference pattern S are varied, and a current signal corresponding to this variation is outputted. Thus, the number of the foreign substances P can be counted based on the number of output times of this signal. Further, the extent of the variation of the intensities of the lights received by the upper and lower light receiving elements 45A and 45B due to the foreign substance P corresponds to the size of the particle diameter of the foreign substance P. Thus, since the intensities of the current signals outputted from the upper light receiving element 45A and the lower light receiving element 45B include information upon the particle diameter of the foreign substance P, the particle diameter of the foreign substance P can also be detected. Accordingly, classification of the detected foreign substances can be performed. That is, it is possible to acquire information upon which one of preset multiple ranges for the particle diameter the detected foreign substance belongs to and information upon how many foreign substances exist in each range.

Figure 13:
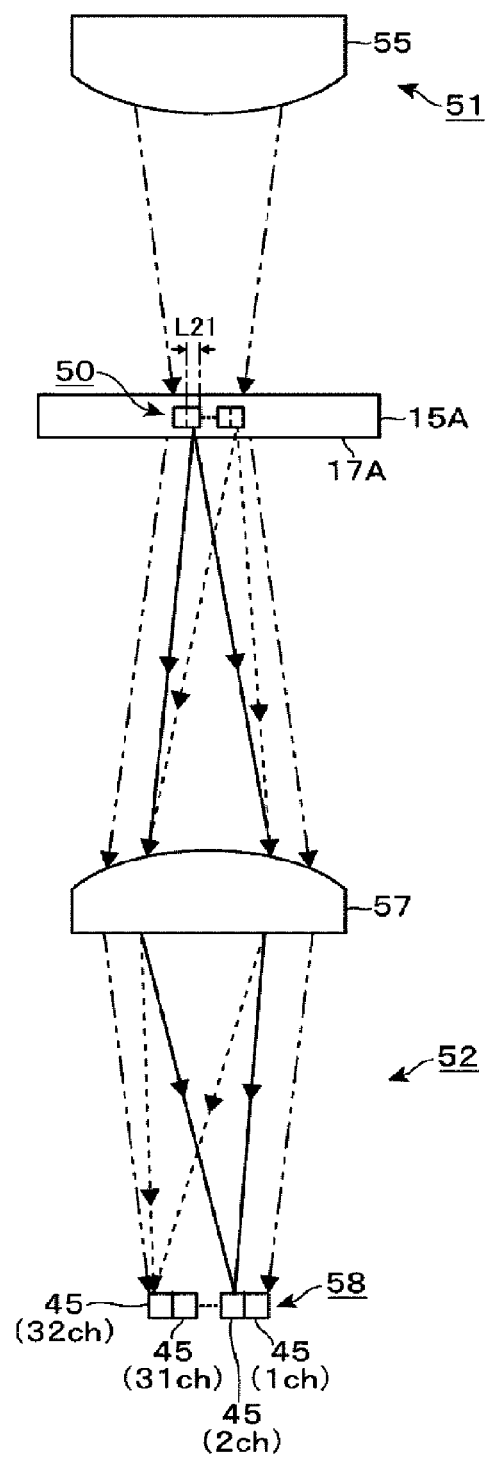
FIG. 13 is a diagram showing a relationship between the measurement region and the light receiving element.

A relationship between the light receiving element 45 and the detection region 50 will be described in further detail with reference to a schematic diagram of FIG. 13. FIG. 13 illustrates the individual components constituting the cuvette 15, the laser light irradiation unit 51 and the light receiving unit 52 viewed from above. Further, a dashed double-dotted arrow in the drawing indicates the optical path of the first laser light outputted from an upper side of the collimator 24. In the optical path of the first laser light within the flow path 17 of the cuvette 15A, respective split light condensing regions, which are obtained by dividing the light condensing region as the light condensing region is split in plural in the lengthwise direction thereof when viewed in the direction toward the front side, will be referred to as a $1^{st}$ region to a $32^{nd}$ region in sequence from the left end. In FIG. 13, boundaries between the neighboring split light condensing regions are indicated by dotted lines, and a width L21 of each split light condensing region in the left-right direction is, for example, in the range from 1 μm to 10 μm.

A condensing lens of the light condensing unit 57 is configured such that: the $1^{st}$ region and the first light receiving element 45A are in one-to-one correspondence; the $2^{nd}$ region and the second light receiving element 45A are in one-to-one correspondence; the $3^{rd}$ region and the third light receiving element 45A are in one-to-one correspondence; and, likewise, the rest of the regions and the light receiving elements of the same reference numbers are in one-to-one correspondence in sequence. That is, in the first light receiving element 45A, a substantially all of a reaction light (light perturbed by a reaction) generated as the light reacts with the foreign substance in the first region is received by the first light receiving element 45A, and a substantially all of the reaction light generated as the light reacts with the foreign substance in the second region is received by the second light receiving element 45A. In this way, equal to or higher than, e.g., 80% of the laser light having passed through the region of each reference number is received by the light receiving element of the corresponding same reference number. By way of example, if the laser light having passed through the region of each reference number is not condensed to only the light receiving element 45A of the corresponding number but is incident on the light receiving element 45A of the other reference number as well, a current level flowing in the light receiving element 45A is reduced, so that the detection accuracy is lowered.

In the above, with regard to the optical path (upper side optical path) of the first laser light within the flow path, the optical path between each of the split light condensing regions, which are obtained by dividing the light condensing region in plural in the lengthwise direction, and each corresponding light receiving element 45A has been described. The same relationship is established for the optical path (lower side optical path) of the second laser light. That is, the regions and the light receiving elements 45B of the same reference numbers are configured to be in one-to-one correspondence in sequence. For example, the $1^{st}$ region and the first light receiving element 45B is in one-to-one correspondence. Further, though the optical path formed when the detection region 50 is formed in the cuvette 15A is described as an example, the optical path is formed in the same manner when the detection region 50 is formed in any of the other cuvettes 15B to 15K.

Figure 12:
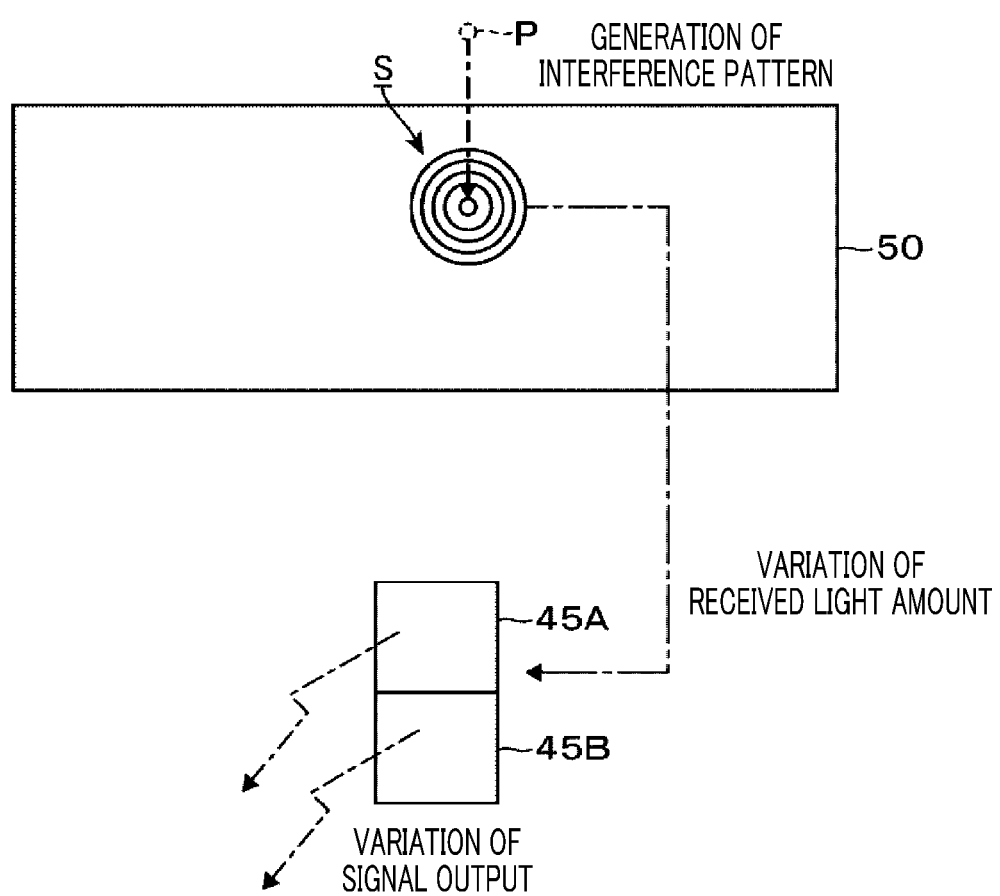
FIG. 12 is a diagram illustrating a detection principle of a foreign substance by the foreign substance detection unit.

With this configuration, the signal corresponding to the generation of the interference pattern S described in FIG. 12 is basically generated from the light receiving elements 45A and 45B of any single channel. Further, in case that the interference pattern is generated at a boundary between two neighboring split light condensing regions, signals corresponding to the generation of the interference pattern S are outputted from the light receiving elements of the two channels. As a result, a single foreign substance may be counted as two. Since, however, a gap (insensitive region) between the light receiving elements is very small as compared to the size of the light receiving element, a ratio where the interference pattern is generated at any single split light condensing region is remarkably larger than a ratio where the interference pattern is generated at the boundary. Thus, even if the single foreign substance is counted as two, the detection accuracy is not deteriorated.

Instead of providing the thirty two channels of the light receiving elements 45A and 45B, it may be considered to provide only a single channel by using transversally elongated light receiving elements 45A and 45B. With this configuration, however, energy of the laser light received per each light receiving element is increased. As an output of the laser light supplied to the light receiving element is increased, a shot noise caused by shaking of photons of the corresponding laser light may be increased, resulting in a decrease of S/N. That is, by providing the multiple channels of the light receiving elements 45A and 45B as stated above, the energy supplied to each single light receiving element can be suppressed, so that the deterioration of the S/N which might be caused by the shot noise may be suppressed. As a result, the detection accuracy for the foreign substance can be improved.

Another reason why the multiple channels of the light receiving elements 45A and 45B are provided will be explained. Among the resist and the thinner within which the foreign substance is detected in the resist coating module 1A, the resist contains a polymer. As stated earlier, this polymer may include a normal polymer having a relatively smaller particle diameter to be regarded as not the foreign substance; and an abnormal polymer having a relatively larger particle diameter to be regarded as the foreign substance. If the normal polymer flows in the detection region 50, the intensities of the lights received by the light receiving elements 45A and 45B may be slightly changed, so that a noise is included in the output signals from the light receiving elements 45A and 45B. As the number of normal polymers, flowing in the region, detected by the light receiving elements 45A and 45B is increased, a level of this noise may be increased, so that the S/N is decreased and the detection accuracy for the foreign substance is deteriorated.

Thus, if it is intended to detect the foreign substances flowing in the entire detection region 50 by providing only one channel of the light receiving elements 45A and 45B as mentioned above, the level of the noise included in the output signals from the light receiving elements 45A and 45B is increased, making it difficult to detect the foreign substances. In contrast, in the configuration in which the multiple channels of the light receiving elements 45A and 45B are provided and the detection is performed on the different split light condensing regions in the detection region 50 of the respective channels as described in FIG. 13, the number of the normal polymers flowing in each single split light condensing region is suppressed as the detection region 50 is divided as stated above, and, thus, the level of the noise included in the output signal from each light receiving element 45 can be reduced. That is, by providing the multiple channels of the light receiving elements, the reduction of the S/N that might be caused by the normal polymers can be suppressed, so that the detection accuracy for the foreign substances can be improved. In order to improve the detection accuracy for the foreign substances, it is desirable that the detection region 50 is split into a larger number of split light condensing regions and the detection is performed by the light receiving elements 45 of a larger number of channels. Here, however, if the number of the split light condensing regions and the channel number of the light receiving elements 45 is equal to or larger than one, it is included in the scope of the present disclosure.

Now, the controller 6 (see FIG. 1) as a foreign substance detector provided in the coating and developing apparatus 1 will be described. The controller 6 is implemented by, for example, a computer and equipped with a non-illustrated program storage. This program storage stores therein a program in which commands (process groups) are recorded to allow various operations such as processings on the wafer W in the respective modules, the above-described detection of the foreign substances based on the signals outputted from the respective channels of the light receiving elements, and a transfer of the wafer W within the coating and developing apparatus 1 by a transfer mechanism to be described later to be performed. As control signals are outputted to the individual components of the coating and developing apparatus 1 from the controller 6 according to the corresponding program, the aforementioned various operations are performed. This program is stored in the program storage while being recorded in a recording medium such as a hard disk, a compact disk, a magnet-optical disk, or a memory card.

The other modules besides the resist coating module 1A shown in FIG. 1 will be briefly explained. The resist coating module 1B has the same configuration as the resist coating module 1. The antireflection film forming modules 1C and 1D and the protective film forming modules 1E and 1F have the same configuration as that of the resist coating modules 1A and 1B except that a chemical liquid for forming an antireflection film and a chemical liquid for forming a protective film are supplied instead of the resist and the thinner. The chemical liquid for forming the antireflection film contains a polymer, the same as the resist. By way of example, in the modules 1C to 1F, one chemical liquid selected from multiple chemical liquids is supplied to the wafer W, the same as in the modules 1A and 1B.

Now, the processing upon the wafer W and the detection of the foreign substance performed in the aforementioned resist coating module 1A will be explained with reference to a timing chart of FIG. 14. This timing chart shows a timing when a pressure of the pump in one supply source 13 among the supply sources 13A to 13K is set; a timing when one nozzle 11, corresponding to the one supply source 13, among the nozzles 11A to 11K is moved by the arm 37; a timing when the valve V1 of the supply line 12, corresponding to the one supply source 13, among the supply lines 12A to 12K is opened/closed; a timing when the state in which the laser light is irradiated from the laser light irradiation unit 51 and the state in which the irradiation of the corresponding laser light is stopped is switched; and a timing when the signals from the respective channels of the light detector 58 is acquired by the control unit 6. The timing when the stat in which the laser light is irradiated and the state in which the irradiation is stopped is switched may also be referred to as a timing when the shutter 41 of the foreign substance detection unit 4 is opened/closed.

First, the wafer W is transferred onto the spin chuck 31 by a transfer mechanism F3 to be described later which is provided in the coating and developing apparatus 1, and held by the spin chuck 31. The nozzle 11K configured to supply the thinner is transferred to above the wafer W by the arm 37. Further, the pump of the supply source 13K performs pumping of the thinner, and, accordingly, the setting is begun such that a preset pressure is obtained (time t1). Concurrently with this movement of the nozzle and the operation of the pump, the laser light irradiation unit 51 and the light receiving unit 52 are moved to positions where the cuvette 15K is located therebetween. At this time, the shutter 41 of the foreign substance detection unit 4 is closed.

The nozzle 11K is stopped to be located above the wafer W (time t2). Subsequently, the valve V1 of the supply line 12K is opened, so that the thinner is force-fed from the pump toward the nozzle 11K at a preset flow rate. Further, the shutter 41 is opened, so that the laser light is irradiated from the laser light irradiation unit 51 to be supplied to the light receiving unit 52 through the cuvette 15K. That is, the detection region 50 by the optical path as described in FIG. 8 and FIG. 9 is formed in the flow path 17K of the cuvette 15K (time t3). The force-fed thinner passes through the cuvette 15K and is discharge from the nozzle 11K onto the central portion of the wafer W. If the degree of openness of the valve V1 is increased to reach a predetermined degree of openness, the increase of the degree of openness of the valve V1 is stopped (time t4). Thereafter, acquisition of the output signal from the circuit unit 46 of each channel as described in FIG. 11 by the controller 6 is begun (time t5).

If the interference pattern is generated as the foreign substance flows in the flow path 17K along with the thinner and flows downwards in the detection region 50, the signal corresponding to this interference pattern is outputted from the light receiving element 45A or 45B of the channel corresponding to the position where the foreign substance flows, and a level of the output signal from the circuit unit 46 is changed. Thereafter, the acquisition of the output signal from the light receiving element 45 of each channel by the controller 6 is stopped (time t6). Then, as the shutter 41 is closed, so that the irradiation of the laser light from the laser light irradiation unit 51 is stopped. Further, the valve V1 of the supply line 12K is closed (time t7), so that the discharge of the thinner onto the wafer W is stopped. Then, the wafer W is rotated, so that the thinner is spread toward a peripheral portion of the wafer W by a centrifugal force.

Between the times t5 and t6, the level of the output signal acquired from the circuit unit 46 of each channel is compared with a preset threshold valve. If the level of the output signal is larger than the threshold value, it implies that the interference pattern is generated. In such a case, the foreign substances are counted for each channel of the light receiving elements. Accordingly, this threshold value is a value corresponding to a level of an electric signal at a time when the interference pattern is generated by the foreign substances in the thinner. Further, the particle diameter of the foreign substance is measured based on the output signal when the signal level exceeds the threshold value, and the classification of the foreign substances is performed. That is, the number of the foreign substances is counted for each of the multiple ranges set for the particle diameter.

The numbers of the foreign substances detected in the respective channels are summed up, and the number of the foreign substances detected in the entire detection region 50 (that is, the total number of the foreign substances) is calculated. Thereafter, it is determined whether the total number of the foreign substances is equal to or larger than a threshold value, and it is also determined whether the number of foreign substances having a particle diameter larger than a predetermined size is equal to or larger than a threshold value. If it is determined that the total number of the foreign substances is equal to or larger than the threshold value or if it is determined that the number of the foreign substances having the particle diameter larger than the preset size is equal to or larger than the threshold value, an alarm is outputted; the operation of the module 1A is stopped; and the processing on the wafer W is stopped. This alarm may be implemented by, by way of example, a preset display on a monitor constituting the controller 6 or an output of a preset sound from a speaker constituting the controller 6. The output of this alarm includes an output of a display or a sound for informing a user of the cuvette 15, among the cuvettes 15A to 15K, abnormality of which is detected. If it is determined that the total number of the foreign substances is not equal to or larger than the threshold value and that the number of the foreign substances having the particle diameter larger than the preset size is not equal to or larger than the threshold value, the output of the alarm is not generated, and the operation of the module 1A is not stopped. Further, the above-stated operations and determinations are performed by the controller 6 which constitutes a counting unit.

Subsequently, the discharge of the resist upon the wafer W and the detection of the foreign substances in this resist are performed according to the timing chart of FIG. 14, the same as in the discharge of the thinner and the detection of the foreign substances in the thinner. By way of example, the description will be provided for an example where the resist of the supply source 13A is discharged onto the wafer W. The nozzle 11A is moved to above the wafer W coated with the thinner, and a pressure of the pump of the supply source 13A is set (time t1). Meanwhile, the laser light irradiation unit 51 and the light receiving unit 52 are moved to positions where the cuvette 15A is located therebetween. The nozzle 11A is stopped (time t2). Then, the valve V1 of the supply source 12A is opened, so that the resist is force-fed from the pump toward the nozzle 11A, and, also, the shutter 41 is opened, so that the detection region 50 by the optical path is formed between the laser light irradiation unit 51 and the light receiving unit 52 via the cuvette 15A (time t3).

If the resist is discharged to the central portion of the wafer W after passing through the cuvette 15A and the degree of openness of the valve V1 reaches a preset level (time t4), the acquisition of the output signal from the light receiving element 45 is begun (time t5). After the acquisition of the output signal is stopped (time t6), the shutter 41 is closed, and the valve V1 is closed to stop the discharge of the resist upon the wafer W (time t7). The wafer W is rotated, and the resist is spread toward the peripheral portion of the wafer W, so that the resist film is formed. Meanwhile, the resist film is formed, a total number of the foreign substances and the particle diameters of the foreign substances are calculated based on the output signal acquired between the times t5 and t6, the same as in the case of supplying the thinner to the wafer W. Then, based on the total number of the foreign substances and the particle sizes thereof, it is determined whether the alarm would be outputted to stop the operation of the module 1A or the operation of the module 1A would be continuously carried on without outputting the alarm.

In case of discharging a resist of another supply source other than the supply source 13A onto the wafer W, the same operations as those performed in case of coating the resist of the supply source 13A in the resist coating module 1A are performed except that a pump of the supply source different from the supply source 13A is operated, the valve V1 of the supply line different from the supply line 12A is opened/closed and the light is irradiated to the cuvette different from the cuvette 15A.

Figure 14:
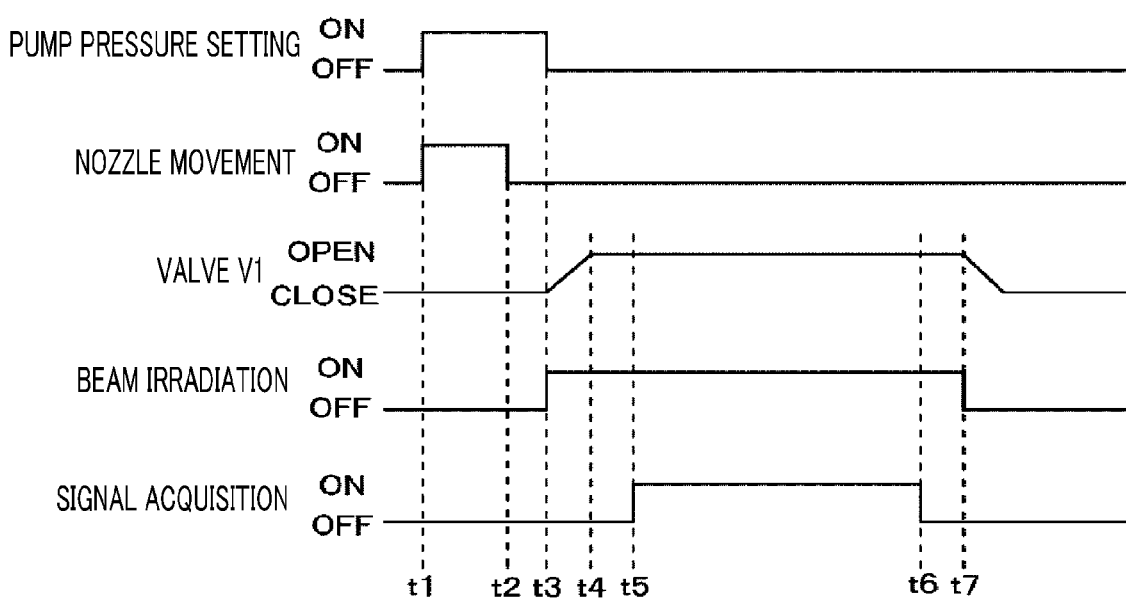
FIG. 14 is an operation timing chart in the foreign substance detection unit.

In the detection of the foreign substances described in the chart of FIG. 14, to improve the detection accuracy by performing the detection of the foreign substances in the state that the liquid flow of the cuvette 15K is stabilized, the timing when the valve V1 is opened/closed and the timing when the acquisition of the output signal by the controller 6 is begun (stopped) are deviated. By way of example, a period between the times t4 and t5 is in the range from 10 milliseconds to 1000 milliseconds, and a period between the times t6 and t7 ranges from 10 milliseconds to 100 milliseconds. In the above, though the operation of the module 1A has been described, for example, the supply of the chemical liquids upon the wafer W and the detection of the foreign substances in the other modules 1B to 1F are performed in the same manner as in the module 1A.

The modules 1A to 1F provided in the coating and developing apparatus 1 includes: the laser light irradiation unit 51 equipped with the optical system 53 configured to flatten the laser light supplied from the light supply unit 2 to the fiber 23 to be lengthened in the direction intersecting with the flow direction of the chemical liquid in the cuvette 15; and the multiple channels of the light receiving elements 45 arranged in the lengthwise direction on the transversal cross section of the optical path at the rear of the cuvette 15. The foreign substances are detected based on the level of the electric signal corresponding to the intensity of the light received by each of the channels of the light receiving elements 45 and the preset threshold value. Accordingly, when the flow path 17 of the cuvette 15 is viewed in the flow direction of the chemical liquid, the area of the detection region 50 which is the condensing region formed within the flow path 17 can be relatively increased, and the shot noise or the noise caused by the polymer in the chemical liquid can be suppressed from being included in the output signals from the light receiving elements 45. As a result, the foreign substance having a small particle diameter can be detected with high accuracy.

Further, by performing the detection of the foreign substance as stated above, cleanness of the chemical liquid supplied to the wafer W is monitored. When the cleanness of the chemical liquid declines below a preset reference, the operation of the module is stopped as stated above, and the processing on a next wafer W is stopped in the corresponding module. Thus, the chemical liquid having low cleanness can be suppressed from being supplied to the next wafer W, so that the decrease of the yield can be avoided. Further, since the supply line 12 from which the foreign substance is detected is specified among the chemical liquid supply lines 12A to 12K, the user of the coating and developing apparatus 1 can perform maintenance or repair promptly after the operation of the module is stopped. Therefore, lengthening of a time period during which the module is stopped can be suppressed, so that the deterioration of the productivity of the semiconductor products in the coating and developing apparatus 1 can be suppressed.

Figure 15:
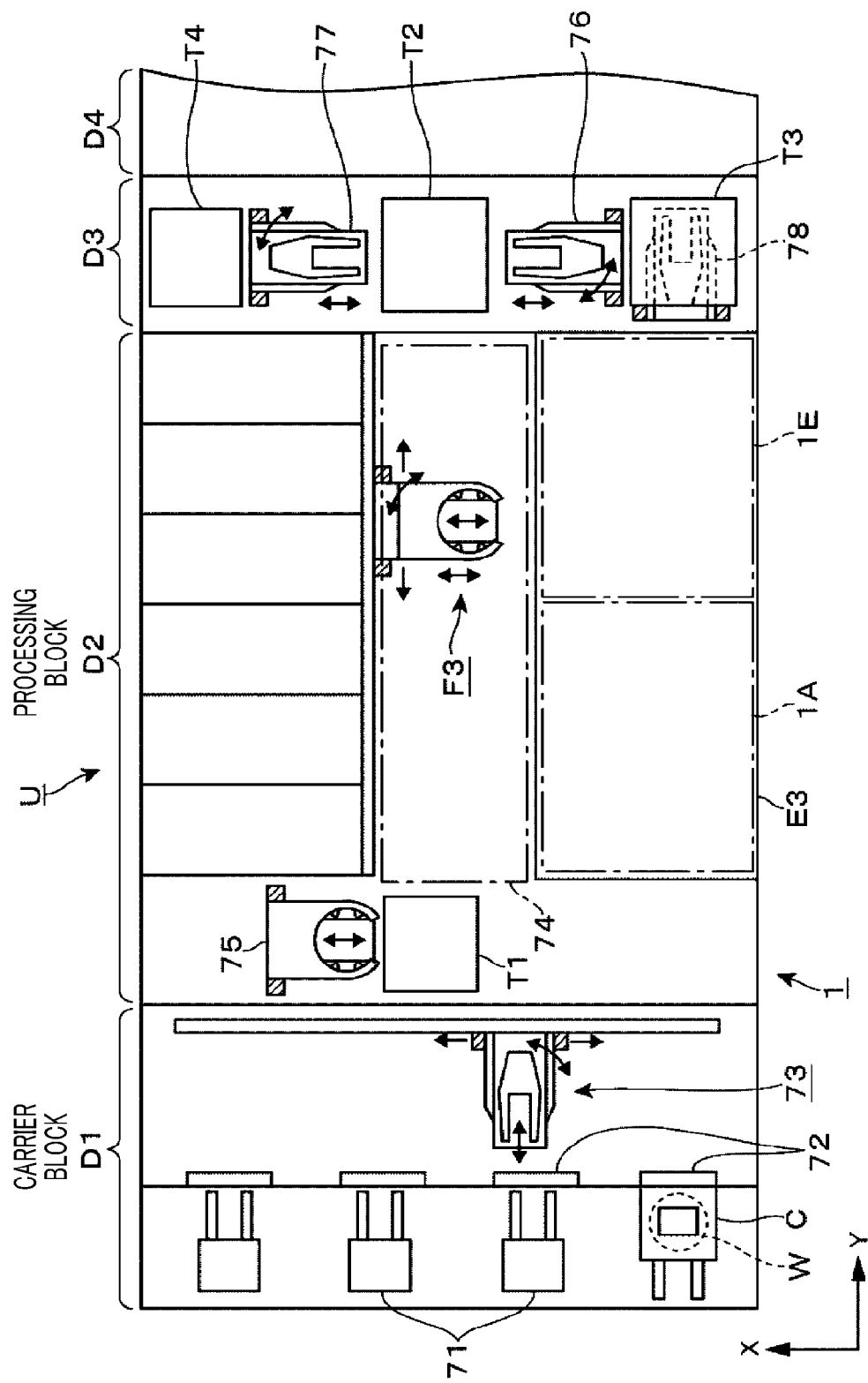
FIG. 15 is a plan view of the coating and developing apparatus.
Figure 16:
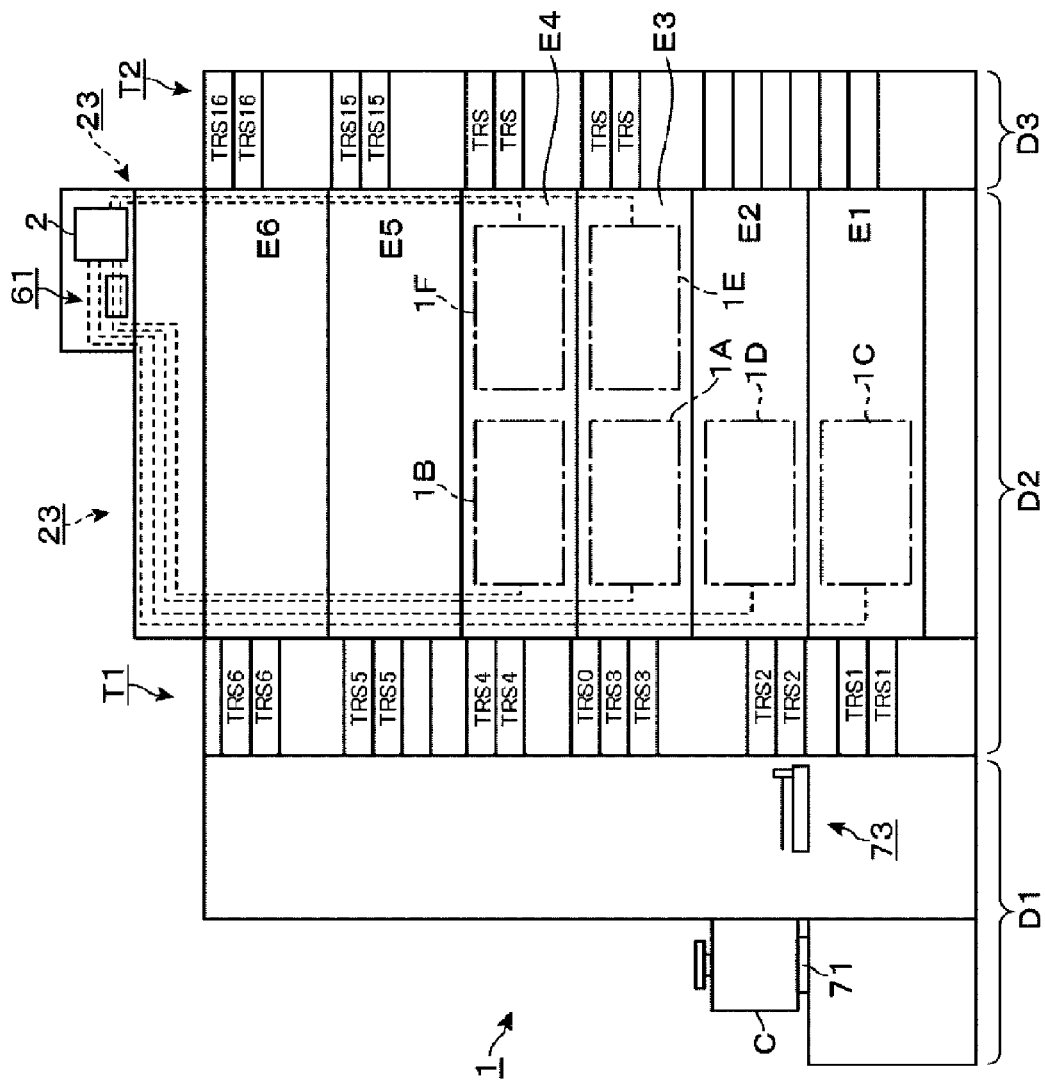
FIG. 16 is a schematic longitudinal sectional view of the coating and developing apparatus.

Now, a specific configuration example of the coating and developing apparatus 1 will be discussed with reference to FIG. 15 and FIG. 16. FIG. 15 and FIG. 16 are a plan view and a schematic longitudinal side view of the coating and developing apparatus 1, respectively. This coating and developing apparatus 1 includes a carrier block D1, a processing block D2 and an interface block D3 which are connected in a straight line shape. An exposure apparatus D4 is connected to the interface block D3. The carrier block D1 is configured to carry a carrier C into or out of the coating and developing apparatus 1 and equipped with a mounting table 71 for the carrier C, an opening/closing unit 72 and a transfer mechanism 73 configured to transfer the wafer W from the carrier C via the opening/closing unit 72.

The processing block D2 includes first to six unit blocks E1 to E6, which are stacked on top of each other in sequence from the bottom and configured to perform liquid processings on the wafer W. The unit blocks E1 to E6 are separated from each other and equipped with transfer mechanisms F1 to F6, respectively. In the respective unit blocks E, the transfers and the processings of wafers W are performed in parallel.

Here, among the unit blocks, the third unit block E3 will be representatively explained with reference to FIG. 15. A transfer region 74 is extended from the carrier block D1 toward the interface block D3, and the aforementioned transfer mechanism F3 is provided in the transfer region 74. Further, when viewed from the carrier block D1 toward the interface block D3, a shelf unit U is disposed at the left side of the transfer region 74. The shelf unit U is equipped with a heating module. Further, when viewed from the carrier block D1 toward the interface block D3, the aforementioned resist coating module 1A and protective film forming module 1E are arranged along the transfer region 74 at the right side of the transfer region 74.

The fourth unit block E4 has the same configuration as the third unit block E3 and is equipped with the resist coating module 1B and the protective film forming module 1F. The unit blocks E1 and E2 have the same configuration as the unit blocks E3 and E4 except that the antireflection film forming modules 1C and 1D are respectively provided therein instead of the resist coating modules 1A and 1B and the protective film forming modules 1E and 1F. Each of the unit blocks E5 and E6 is equipped with a developing module configured to develop a resist film by supplying a developing liquid onto the wafer W. The developing module has the same configuration as the modules 1A to 1F except that it supplies the developing liquid onto the wafer W.

A tower T1 vertically extended along the unit blocks E1 to E6 and a vertically movable transfer mechanism 75 configured to transfer the wafer W with respect to the tower T1 are provided at a carrier block D1 side within the processing block D2. The tower T1 is composed of a multiple number of modules stacked on top of each other, and these modules provided at the same heights as the unit blocks E1 to D6 are configured to transfer wafers W to/from the transfer mechanisms F1 to F6 of the unit blocks E1 to E6, respectively. These modules include transit modules TRS provided at the height positions of the respective unit blocks, a temperature control module CPL configured to perform a temperature control over the wafer W, a buffer module configured to temporality accommodate therein a plurality of wafers W, a hydrophobizing module configured to hydrophobize a surface of the wafer W; and so forth. For the simplicity of explanation, illustration of the hydrophobizing module, the temperature control module and the buffer module is omitted.

The interface block D3 includes towers T2, T3 and T4 vertically extended along the unit blocks E1 to E6, and is equipped with a vertically movable transfer mechanism 76 configured to transfer the wafer W with respect to the tower T2 and the tower T3; a vertically movable transfer mechanism 77 configured to transfer the wafer W with respect to the tower T2 and the tower T4; and a transfer mechanism 78 configured to transfer the wafer W between the tower T3 and the exposure apparatus D4.

The tower T2 includes transit modules TRS, a buffer module configured to accommodate therein a plurality of wafers before being subjected to an exposure processing, a buffer module configured to accommodate therein a plurality of wafers W after being subjected to the exposure processing, a temperature control module configured to perform the temperature control over the wafer W, and so forth. These modules are stacked on top of each other. Here, illustration of the buffer modules and the temperature control module is omitted.

The aforementioned light supply unit 2 is provided above the processing block D2, and the fiber 23 is wound downwards to be connected from the light supply unit 2 to the modules 1A to 1F of the unit blocks E1 to E4. Further, also provided above the processing block D2 is an operation unit 61 which constitutes the controller 6 and is configured to calculate the number of foreign substances for each channel, the total number of the foreign substances and the particle diameter of each foreign substance based on the output signals from the circuit unit of each channel. The operation unit 61 and the modules 1A to 1F are connected via a non-illustrating wiring.

A transfer path of the wafer W in this coating and developing apparatus 1 will be explained. The wafer W is transferred by the transfer mechanism 73 from the carrier C into a transit module TRS0 of the tower T1 in the processing block 2. Then, the wafer W is transferred into either one of the unit block E1 and the unit block E2 from the transit module TRS0. By way of example, in case of delivering the wafer W into the unit block E1, the wafer W is delivered from the transit module TRS0 into, among the transmit modules TRS of the tower T1, a transmit module TRS1 corresponding to the unit block E1 (that is, the transit module to which the wafer W can be delivered by the transfer mechanism F1). In case of delivering the wafer W into the unit block E2, on the other hand, the wafer W is transferred from the transit module TRS0 into, among the transit modules TRS of the tower T1, a transit module TRS2 corresponding to the unit block E2. This transfer of the wafer W is performed by the transfer mechanism 75.

The wafer W delivered in this way is then transferred in the order of the transit module TRS1 (TRS2)→the antireflection film forming module 1C (1D)→the heating module→the transit module TRS1 (TRS2), and is then sent by the transfer mechanism 75 into either the transit module TRS3 corresponding to the unit block E3 or the transit module TRS4 corresponding to the unit block E4.

The wafer W sent to the transit modules TRS3 (TRS4) is then transferred in the order of the transit module TRS3 (TRS4)→the resist film coating module 1A (1B)→the heating module→the protective film forming module 1E (1F) →heating module→a transit module TRS of the tower T2. Thereafter, this wafer W is carried into the exposure apparatus D4 by the transfer mechanisms 76 and 78 via the tower T3. The wafer W after being exposed is transferred between the towers T2 and T4 by the transfer mechanism 78 and 77 and delivered into transmit modules TRS15 and TRS16 of the tower T2 corresponding to the unit blocks E5 and E6, respectively. Thereafter, the wafer W is transferred in the order of the heating module→the developing module→the heating module→the transmit module TRS5 (TRS6), and then, is returned back into the carrier C by the transfer mechanism 73.

The exemplary embodiment may be applied to the developing modules of the unit blocks E5 and E6 to detect the foreign substances in the developing liquid. Besides, the exemplary embodiment may also be applicable to various other kinds of chemical liquid supply apparatuses such as a chemical liquid supply module (chemical liquid supply apparatus) configured to form an insulating film on the wafer W, a cleaning apparatus configured to supply a cleaning liquid as the chemical liquid for cleaning the wafer W and an apparatus configured to supply, as the chemical liquid, an adhesive for attaching a plurality of wafers W to each other. Further, in the aforementioned cleaning apparatus, pure water, IPA (isopropyl alcohol) or a mixed solution of ammonia water and hydrofluoric acid, which is called SC1, is supplied as the cleaning liquid, for example. Here, these pure water, IPA and SC1 may be respectively flown in the multiple cuvettes 15 constituting the single flow path array 16. Further, there may be built up a configuration in which not only the chemical liquid used in the single module is flown in each cuvette 15 but the resist used in the resist coating module 1A and the chemical liquid for forming the protective film used in the protective film forming module 1E may also be flown in each cuvette 15 of the single flow path array 16.

Further, if it is determined that the total number of the foreign substances flowing in the detection region 50 is equal to or larger than the threshold value and/or if it is determined that the number of the foreign substances having the particle diameter larger than the preset size is equal to or larger than the threshold value as described above, a countermeasure may not be limited to outputting the alarm or stopping the operation of the corresponding module. By way of example, from the chemical liquid supply source 13 corresponding to the cuvette 15 on which such a determination is made, the chemical liquid may be supplied into the nozzle 11 as the cleaning liquid for the chemical liquid supply line 12, and the foreign substances included in the chemical liquid supply line 12 may be removed through the nozzle 11. That is, the chemical liquid supply line 12 is automatically cleaned. After this operation, the processing upon the next wafer W may be begun.

In case of performing the cleaning of the chemical liquid supply line 12 as stated above, the detection of the foreign substances may be performed while supplying the cleaning liquid to the nozzle, the same as in the case of processing the wafer W by supplying the chemical liquid onto the wafer W, and the controller 6 may determine whether the total number of the foreign substances is equal to or larger than the threshold value and whether the number of the foreign substances having the particle diameter larger than the preset size is equal to or larger than the threshold value. Then, based on this determination result, the controller 6 may decide whether to carry on the cleaning of the chemical liquid supply line 12 or to stop it. With this configuration, the module found to be abnormal can be promptly recovered to be available again. Further, when using the apparatus again after not using it for a certain time or after assembling the apparatus, this cleaning of the chemical liquid supply line 12 may be performed. In such a case, a timing when the module becomes available after the foreign substances having a relatively large particle diameter is reduced can be detected, the processing upon the wafer W by the module can be started in a prompt manner.

Moreover, the present exemplary embodiment is not limited to being applied to the chemical liquid supply apparatus. By way of example, a cuvette 15 for a gas flow may be provided in the flow path array 16, provided separately from the cuvette 15 in which the chemical liquid is flown. An atmosphere of a region such as the transfer region 74 in which the wafer W is transferred in the coating and developing apparatus 1 may be introduced into the cuvette 15 for the gas flow by a suction pump or the like. The region in which the wafer W is transferred includes a region such as the resist coating module 1A in which the wafer W is processed. The same as in the case of detecting the foreign substances in the chemical liquid, the detection of the foreign substances may be performed by forming the optical path in the cuvette for the gas flow while the gas is being flown in the corresponding cuvette. Thus, according to the present exemplary embodiment, it is possible to detect the foreign substances contained in a fluid supplied to the wafer W.

Besides the gas which forms the atmosphere for the transfer of the wafer, the foreign substances in a gas used to process the wafer W may also be detected. For example, in the aforementioned developing module, after the developing liquid is supplied to the wafer W and pure water is supplied to clean the surface of the wafer W, a $N_2$ (nitrogen) gas is supplied from a nozzle to dry the surface of the wafer W. The detection of the foreign substances contained in the $N_2$ gas flowing in a supply path to this nozzle may be conducted in the same way as the above-described detection of the foreign substances contained in the resist is performed.

Furthermore, the cuvettes 15 may not be limited to being arranged on the straight line but may be arranged on a curved line. In addition, the laser light irradiation unit 51 and the light receiving unit 52 may be provided in each of the cuvettes 15. However, the above-described configuration in which the laser light irradiation unit 51 and the light receiving unit 52 are moved in the arrangement direction of the cuvettes 15 to be commonly shared by the multiple cuvettes 15 is desirable in that scale-up of the laser light irradiation unit 51 and the light receiving unit 52 can be avoided. Further, in the above-described exemplary embodiment, though the number of the foreign substances flowing in the cuvette for a preset time period is counted, detecting only the presence/absence of the foreign substances without counting the number thereof is also included in the scope of the present disclosure. Moreover, the above-described configuration examples may be combined, replaced or modified.

<Evaluation Tests>

Now, evaluation tests conducted regarding the present disclosure will be discussed.

(Evaluation Test 1)

As Evaluation test 1-1, a test liquid, in which a ratio of the foreign substance included therein and a particle diameter of the corresponding foreign substance are already known, is supplied into one of the cuvettes of the above-described foreign substance detection unit 4, and a ratio (counting efficiency) of detected particles with respect to all the particles flowing in the cuvette 15 is investigated. Here, the optical system 53 of the laser light irradiation unit 51 in this foreign substance detection unit 4 is configured such that the transversal cross section of the optical path in the condensing region of the cuvette 15 is of a substantially circular spot shape of 1.2 µm. As the test liquid, three kinds of test liquids respectively containing the foreign substances having the particle diameter of 60 nm, 46 nm and 29 nm are used, and the counting efficiency is measured for each test liquid.

Further, as Evaluation test 1-2, the counting efficiency is measured under the same conditions as the Evaluation test 1-1 except that the optical system 53 is configured such that the transversal cross sectional of the optical path in the condensing region within the cuvette 15 is of an elliptic shape as described in the exemplary embodiment. This elliptic spot has a long diameter of 40 µm and a short diameter of 1.2 µm. The optical system 53 of the laser light irradiation unit 51 is configured such that energy density per unit area in this spot equals at individual positions.

In the Evaluation test 1-1, when the test liquids respectively containing the foreign substances having the particle diameter of 60 nm, 46 nm and 29 nm are used, the counting efficiency is found to be 0.02%, 0.004% and 0.0003%, respectively. In the Evaluation test 1-2, when the test liquids respectively containing the foreign substances having the particle diameter of 60 nm, 46 nm and 29 nm are used, the counting efficiency is found to be 1%, 0.2% and 0.002%. As can be seen from this result, by configuring the optical system 53 such that the transversally elongated detection region 50 is formed as described in the above exemplary embodiment, the counting efficiency for the foreign substances can be improved, and, thus, the detection accuracy for the foreign substances can be bettered.

(Evaluation Test 2)

As Evaluation test 2, in the foreign substance detection unit 4, chemical liquids respectively containing different concentrations of polymers are supplied to the cuvettes 15, and signal intensities outputted from the circuit units 46 of the respective channels are measured. In this foreign substance detection unit 4, the optical system 53 of the laser light irradiation unit 51 is configured such that the transversal cross section of the optical path in the condensing region within each cuvette 15 becomes an elliptic spot having a long diameter in the left-right direction, as described in the exemplary embodiment. However, the present configuration is different from the above-described configuration example in that there is a relatively large difference in the energy distribution between individual positions within the spot and the energy increases toward a central portion of the spot. That is, the energy distribution is different between the split light condensing regions in the detection region 50 described in FIG. 13. As the chemical liquids, there are used a resist containing a preset concentration of polymer, and a first chemical liquid, a second chemical liquid, a third chemical liquid and a fourth chemical liquid containing polymethyl methacrylate resin (PMMA) as a polymer of 5%, 1.25%, 0.5% and 0%, respectively. The aforementioned measurement of the signal intensities is performed for each of the used chemical liquids.

Figure 17:
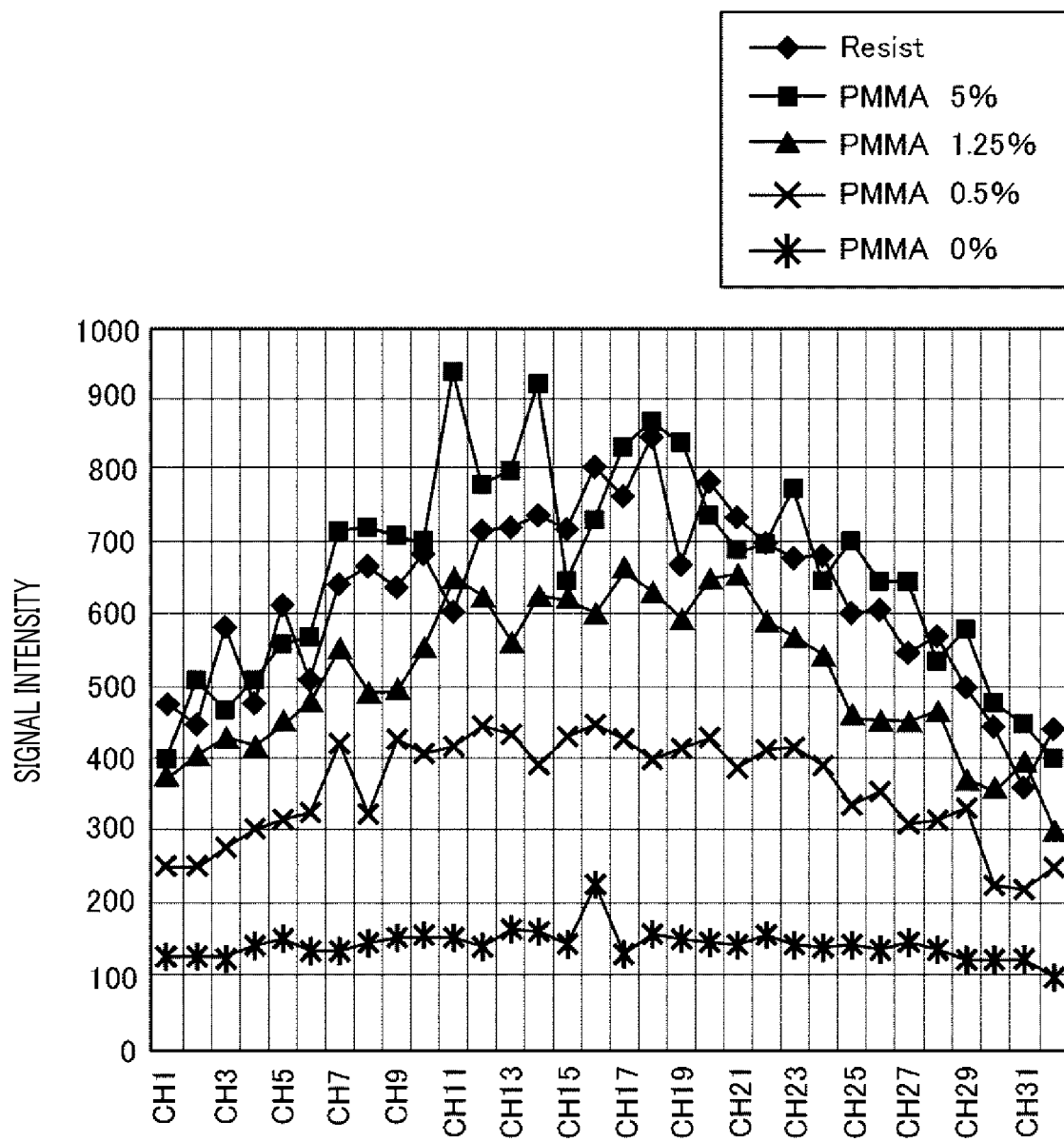
FIG. 17 is a schematic diagram showing a result of an evaluation test.

A graph of FIG. 17 shows a result of the Evaluation test 2. A horizontal axis of the graph indicates the channel number of the circuit unit 46, and a vertical axis of the graph indicates the signal intensity outputted from the circuit unit 46. As can be seen from this graph, in case of using the polymer-containing resist and the first to third chemical liquids, as the energy at the split light condensing region is lower, the signal intensity outputted from the circuit unit 46 corresponding to this split light condensing region is lowered. Further, from the results of the cases using the first to fourth chemical liquids, it is found that the difference in the signal intensity between the channels is increased as the ratio of the polymer included in the chemical liquid is increased.

The smaller the particle diameter of the foreign substance as the detection target is, the lower is the intensity of the detection signal outputted from the circuit unit 46 due to this foreign substance. Accordingly, as for the channel from which the electric signal having a relatively low intensity is outputted in the Evaluation test 2, there may be a concern that the detection of the foreign substances may not be performed when the chemical liquid containing the foreign substances having a smaller particle diameter is used. Thus, as described according to the exemplary embodiment, it may be effective to configure the optical system 53 of the laser light irradiation unit 51 such that the difference in the energy distribution is suppressed between the individual positions of the spot and, also, to configure the optical system 53 such that the energy distribution within the detection region 50, which is the transversally elongated central portion of the elliptic shape, becomes substantially uniform within the detection region 50 in the left-right direction as described in FIG. 9, that is, the energy becomes substantially uniform between the individual split light condensing regions.

The graph of FIG. 17 will be further discussed. As stated above, the graph shows the detection signal intensities of the polymers detected from the various kinds of chemical liquids containing the polymers for the individual channels of the light receiving elements 45. When each chemical liquid flows in the cuvette 15, the size of the polymers passing through the individual split light condensing regions may be substantially same between the split light condensing regions. As depicted in FIG. 17, however, the detected signal intensities are different between the channels.

The transversal cross section of the optical path within the condensing region within the cuvette 15 is of the elliptic shape the long diameter of which is aligned in the arrangement direction of the split light condensing regions. As can be seen from FIG. 17, a signal having a higher intensity is outputted from a channel corresponding to a central portion of the ellipse having a high energy intensity, as compared to a channel corresponding to a peripheral portion of the ellipse having a low energy density. In consideration of this signal outputs, it is deemed that a minimum measurable particle diameter of the channel corresponding to the central portion of the ellipse becomes smaller than a minimum measurable particle diameter of the channel corresponding to the peripheral portion of the ellipse.

To perform the highly accurate detection and improve the measurement accuracy for the individual channels, non-uniformity between these channels needs to be avoided. For the purpose, it is required to uniform the energy density in the direction of the long diameter of the ellipse. That is, it is required to allow any of the split light condensing regions to have a relatively high and appropriate energy density. The light condensing unit 55 including the aforementioned Powell lens is configured to perform the above condensing.

It can also be seen from the graph of FIG. 17 that the detection signal intensity increases as the concentration of the polymer included in the chemical liquid increases. This result indicates that as the concentration of the polymer contained in the chemical liquid increases, the background noise (noise floor) caused by the normal polymer increases. That is, as the number of abnormal polymers flowing in the split light condensing regions corresponding to the channels of the light receiving element 45 increases, the noise floor increases. Thus, as described above with reference to FIG. 13, it is required to reduce the number of normal polymers flowing in the split light condensing regions corresponding to the channels of the single light receiving element 45 needs to be reduced by increasing the number of the channels of the light receiving element 45. As a result, the noise floor is reduced, so that the S/N can be improved.

(Evaluation Test 3)

Figure 18:
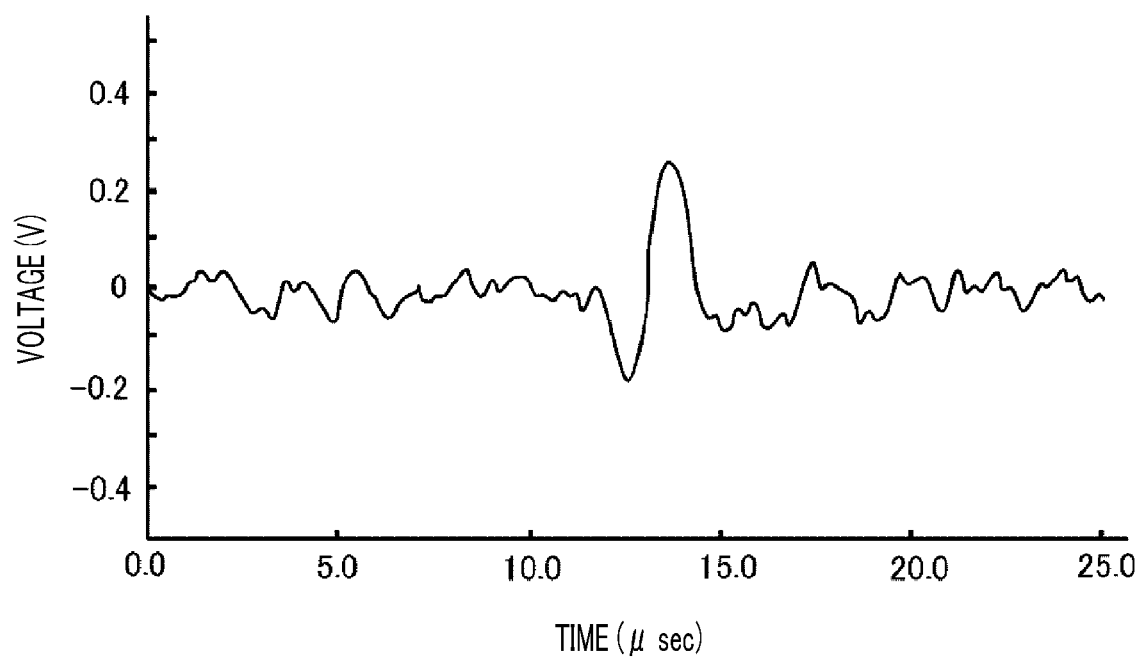
FIG. 18 is a schematic diagram showing a result of an evaluation test.
Figure 19:
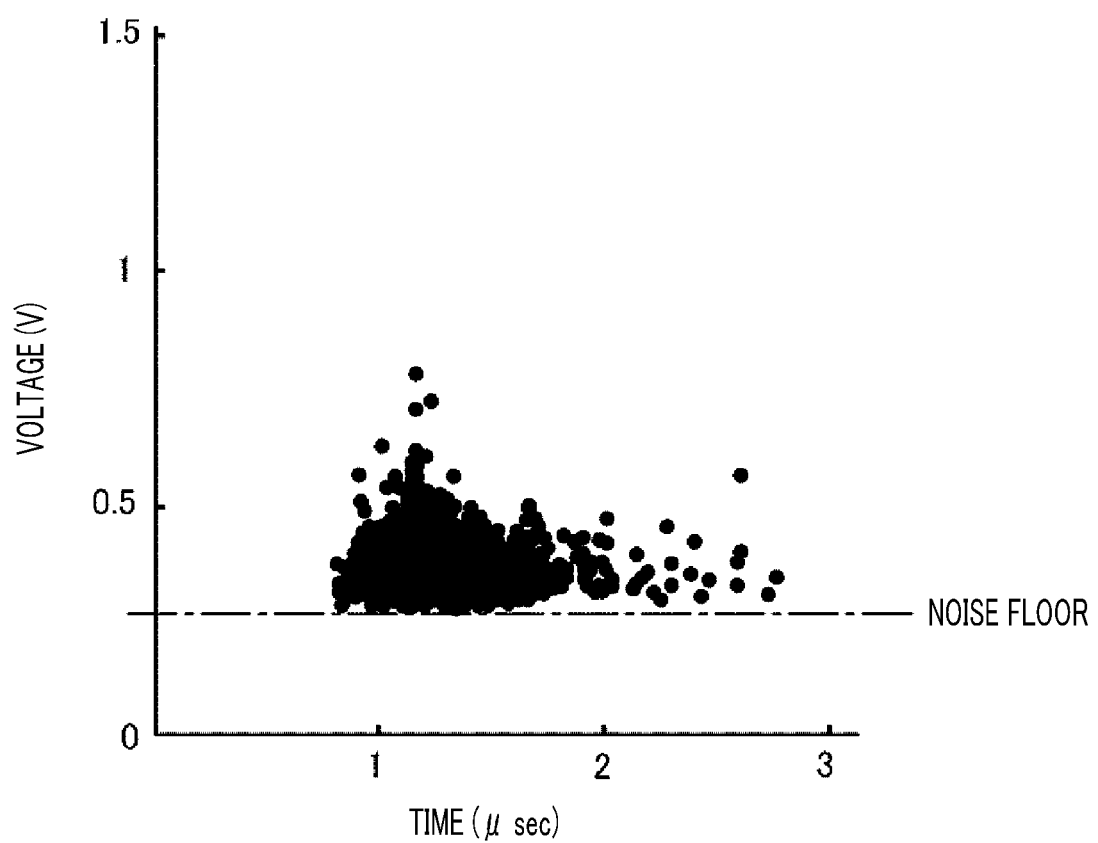
FIG. 19 is a schematic diagram showing a result of an evaluation test.

As Evaluation test 3, a test liquid containing multiple foreign substances having preset non-uniformity with respect to the particle diameter of 29 nm is supplied into the cuvettes 15 of the foreign substance detection unit 4 as described in the exemplary embodiment, and the detection of the foreign substances is performed. A graph of FIG. 18 shows a waveform of the signal output from the circuit unit 46 of the single channel during this detection. A horizontal axis of this graph indicates a time (unit: μ sec) and a vertical axis, a signal voltage (unit: V). A waveform having a relatively large peak which appears at 13 μsec to 14 μsec on the graph is a waveform resulted from the interference pattern generated by the foreign substances. A graph of FIG. 19 is produced by potting the peak values larger than the noise floor in the waveforms obtained from the circuit units 46 of the respective channels. A horizontal axis and a vertical axis of the graph of FIG. 19 indicate the time and the signal voltage, the same as in FIG. 18. As can be seen from the graph of FIG. 19, the number of the plots is plural. Further, a dashed line on the graph shows the aforementioned noise floor.

It is found out from the result of this Evaluation test 3 that even a microscopic foreign substance having a particle diameter of 29 nm can be detected by the foreign substance detection unit 4. Further, as a result of performing the same experiments as the Evaluation test 3 by using a test liquid containing foreign substances having a particle diameter of 46 nm and a test liquid containing foreign substances having a particle diameter of 60 nm, it is also found that those foreign substances can still be detected.

The claims of the present application are different and possibly, at least in some aspects, broader in scope than the claims pursued in the parent application. To the extent any prior amendments or characterizations of the scope of any claim or cited document made during prosecution of the parent could be construed as a disclaimer of any subject matter supported by the present disclosure, Applicants hereby rescind and retract such disclaimer. Accordingly, the references previously presented in the parent applications may need to be revisited.

W: Wafer
1A: Resist coating module
12A~12K: Chemical liquid supply line
15: Cuvette
16: Flow path array
17: Flow path
21: Light source
4: Foreign substance detection unit
45: Light receiving element
46: Circuit unit
50: Detection region
51: Laser light irradiation unit
52: Light receiving unit
6: Controller

We claim:

1. A chemical liquid supply apparatus configured to perform a processing by supplying a chemical liquid to a substrate, the apparatus comprising:
   a flow path formation unit configured to form a plurality of flow paths through which the chemical liquid supplied to the substrate is flown and through which a light passes;
   a chemical liquid supply unit configured to supply the chemical liquid to the flow path formation unit such that the chemical liquid is supplied to a selected one of the plurality of flow paths;
   a laser light irradiation unit, commonly shared by the plurality of flow paths, configured to irradiate a laser light into each of the plurality of flow paths;
   a light receiving element, commonly shared by the plurality of flow paths, disposed to face the laser light irradiation unit with the flow path formation unit therebetween;
   a foreign substance detection unit configured to detect foreign substances in the chemical liquid based on a signal output from the light receiving element; and
   a moving mechanism configured to move the laser light irradiation unit and the light receiving element to a position corresponding to the selected one of the plurality of flow paths to detect the foreign substances in the chemical liquid supplied to the selected one of the plurality of flow paths.

2. The chemical liquid supply apparatus of claim 1,
   wherein the foreign substance detection unit is further configured to count a number of the detected foreign substances for each of multiple ranges set for a particle diameter of the detected foreign substances.

3. The chemical liquid supply apparatus of claim 1, further comprising:
- a shutter configured to open/close an optical path between the laser light irradiation unit and a light source configured to supply a light to the laser light irradiation unit,
- wherein while the laser light irradiation unit and the light receiving element is being moved between a position corresponding to the selected one of the plurality of flow paths and another position corresponding to another one of the plurality of flow paths by the moving mechanism, the optical path is closed by the shutter.

4. The chemical liquid supply apparatus of claim 1,
- wherein the foreign substance detection unit is further configured to determine whether or not to stop supplying of the chemical liquid to a following substrate based on a signal output from the light receiving element obtained while the chemical liquid is being supplied to the substrate.

5. A coating and developing system comprising:
- a chemical liquid supply apparatus as claimed in claim 1;
- a mounting table configured to mount a carrier in which the substrate is accommodated; and
- a transfer mechanism configured to transfer the substrate between the carrier and the chemical liquid supply apparatus,
- wherein the chemical liquid supply apparatus is a coating and developing apparatus configured to perform a coating and developing process.

* * * * *